(12) United States Patent
Higuchi et al.

(10) Patent No.: US 7,995,262 B2
(45) Date of Patent: Aug. 9, 2011

(54) ELECTROCHROMIC DISPLAY DEVICE

(75) Inventors: Tetsuya Higuchi, Tsukuba (JP); Masao Suzuki, Tsukuba (JP); Toshimi Fukuoka, Tsukuba (JP); Wu Weng, Tsukuba (JP)

(73) Assignees: Funai Electric Advanced Applied Technology Research Institute Inc., Daito-shi (JP); Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 12/617,411

(22) Filed: Nov. 12, 2009

(65) Prior Publication Data
US 2010/0134865 A1   Jun. 3, 2010

(30) Foreign Application Priority Data

Nov. 13, 2008  (JP) ................................. 2008-290841

(51) Int. Cl.
*G02F 1/153* (2006.01)
(52) U.S. Cl. ......... 359/273; 359/265; 359/269; 359/271
(58) Field of Classification Search .................... 359/273
See application file for complete search history.

(56) References Cited

U.S. PATENT DOCUMENTS

| | | | | |
|---|---|---|---|---|
| 3,451,741 A | * | 6/1969 | Manos | 359/275 |
| 4,957,352 A | * | 9/1990 | Yasuda et al. | 359/275 |
| 2008/0297878 A1 | * | 12/2008 | Brown et al. | 359/263 |

FOREIGN PATENT DOCUMENTS

| | | |
|---|---|---|
| EP | 1 887 416 A1 | 2/2008 |
| JP | 2007-178733 A | 7/2007 |
| JP | 2007-314721 A | 12/2007 |
| JP | 2008-32911 A | 2/2008 |

OTHER PUBLICATIONS

Extended European Search Report dated May 20, 2010 (nine (9) pages).

* cited by examiner

*Primary Examiner* — Jessica T Stultz
(74) *Attorney, Agent, or Firm* — Crowell & Moring LLP

(57) ABSTRACT

Disclosed is an electrochromic display device comprising: a first substrate; a first electrode; a second substrate; a second electrode; and an electrochromic composition layer, wherein the device is of a passive matrix drive where the device performs a display by an energization between the electrodes, and performs a erasion of the display, wherein the first electrode comprises electrodes, the second electrode comprises a plurality of transparent display electrodes, a pixel is formed where the electrodes are in a grade separated crossing, at least a surface of the electrodes is respectively oxidized, the electrochromic composition layer comprising (i) insulative partition walls and (ii) an electrochromic composition including a supporting electrolyte, a polar solvent, and a leuco dye, and wherein the device displays a selected pixel by applying a voltage of a first potential difference, and applies the voltage of a second potential difference so as not to cause any energization.

6 Claims, 8 Drawing Sheets ated ELECTROCHROMIC DISPLAY DEVICE

BACKGROUND OF THE INVENTION

1. Field of the Invention

The present invention relates to an electrochromic display device.

2. Description of Related Art

The publications in the forms of electronic books, that is, electronic publishing, have come to be actively performed in place of the publications by conventional printing techniques as electronic information networks have spread. As the apparatus displaying electronic information to be distributed in these networks, for example, cathode ray tube (CRT) displays and back light type liquid crystal displays have been used. However, the displays by means of these displays are restricted in places to be read, and are inferior also in the handling aspects of the displays in terms of their weights, sizes, shapes, and portability in comparison with the common displays printed on paper. Moreover, because these displays consume much electric power, the restriction of display times is also caused in the case of battery drives. Furthermore, all of these displays is a light emitting type display, and has the problem of causing extreme fatigue at the time of a long hour steady gaze.

Consequently, a display device capable of settling the problems mentioned above is desired, and further a rewritable display device is desired. As these display devices, a display called a paper-like display or electronic paper has been proposed. To put it concretely, for example, the following display devices have been proposed in the past: the display device of a reflective liquid crystal system, the display device of an electrophoretic system, the display device of the system of rotating dichromatic particles in an electric field, and the display device of an electrochromic system (see, for example, Japanese Patent Application Laid-Open Publications No. 2007-178733, No. 2007-314721, and No. 2008-032911).

Incidentally, a display device of the electrochromic system (electrochromic display device) uses a display material such as an electrochromic composition containing a precursor of a dye, such as a leuco dye, which colors on the surface of an electrode, as an essential ingredient. Because the leuco dye has a high chromogenic property at low power and the possibility of being capable of displaying each color, the leuco dye is a superior material as an electrochromic material. Furthermore, because the leuco dye is versatile as a recording material for thermal recording and the like, and because the leuco dye can be easily procured and supplied at a comparatively low cost, the leuco dye is a superior material as an electrochromic material also from the point of view of cost.

Accordingly, when the electrochromic display device using the leuco dye is applied as the electronic paper, it is desired to use a low cost drive system also as the drive system of the electrochromic display device, and, for example, it is desirable to use a passive matrix drive capable of driving the electrochromic display device without using any expensive materials, such as thin film transistors (TFTs).

However, when the electrochromic display device using the leuco dye is used as the display device of the passive matrix drive, then a sufficient display density cannot be obtained when the electrochromic display device is driven at a high speed, and the writing speed of several hundreds of milliseconds per line is required in order to obtain a high quality display. That is, for example, when the electrochromic display device using the leuco dye is applied as a sheet of electronic paper (A6 size), then 24 seconds (=0.1 second×240 lines) are estimated to be needed for displaying a page from a calculation based on the writing speed of 100 milliseconds per line even in the case of setting the resolution of the page to Quarter Video Graphics Array (QVGA), which is comparatively coarse, and the electrochromic display device has the problem of lacking utility.

SUMMARY OF THE INVENTION

The present invention is directed to realize the display of a high speed and a high quality by an electrochromic display device using the leuco dye by the passive matrix drive.

According to an aspect of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed with a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, wherein at least a surface of the first electrode and of the second electrode is respectively oxidized, wherein the electrochromic composition layer comprises (i) a plurality of insulative partition walls which extend parallely in the direction perpendicular to the extending direction of the first electrode in a state of being arranged between the second electrode adjoining each other, and (ii) an electrochromic composition introduced between the insulative partition walls adjoining each other, the electrochromic composition including a supporting electrolyte, a polar solvent, and a leuco dye, and wherein the electrochromic display device displays a selected pixel by applying a voltage of a first potential difference between the first electrode used as a negative electrode and the second electrode used as a positive electrode, the first electrode and the second electrode respectively forming the selected pixel, and applies the voltage of a second potential difference smaller than the first potential difference so as not to cause any energization between the first electrode used as the positive electrode other than the first electrode forming the selected pixel, and the second electrode used as the negative electrode other than the second electrode forming the selected pixel.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

In the following, the best mode for implementing the present invention will be described in detail with reference to the accompanying drawings. Incidentally, the scope of the invention is not limited to the shown examples.

Figure 1:
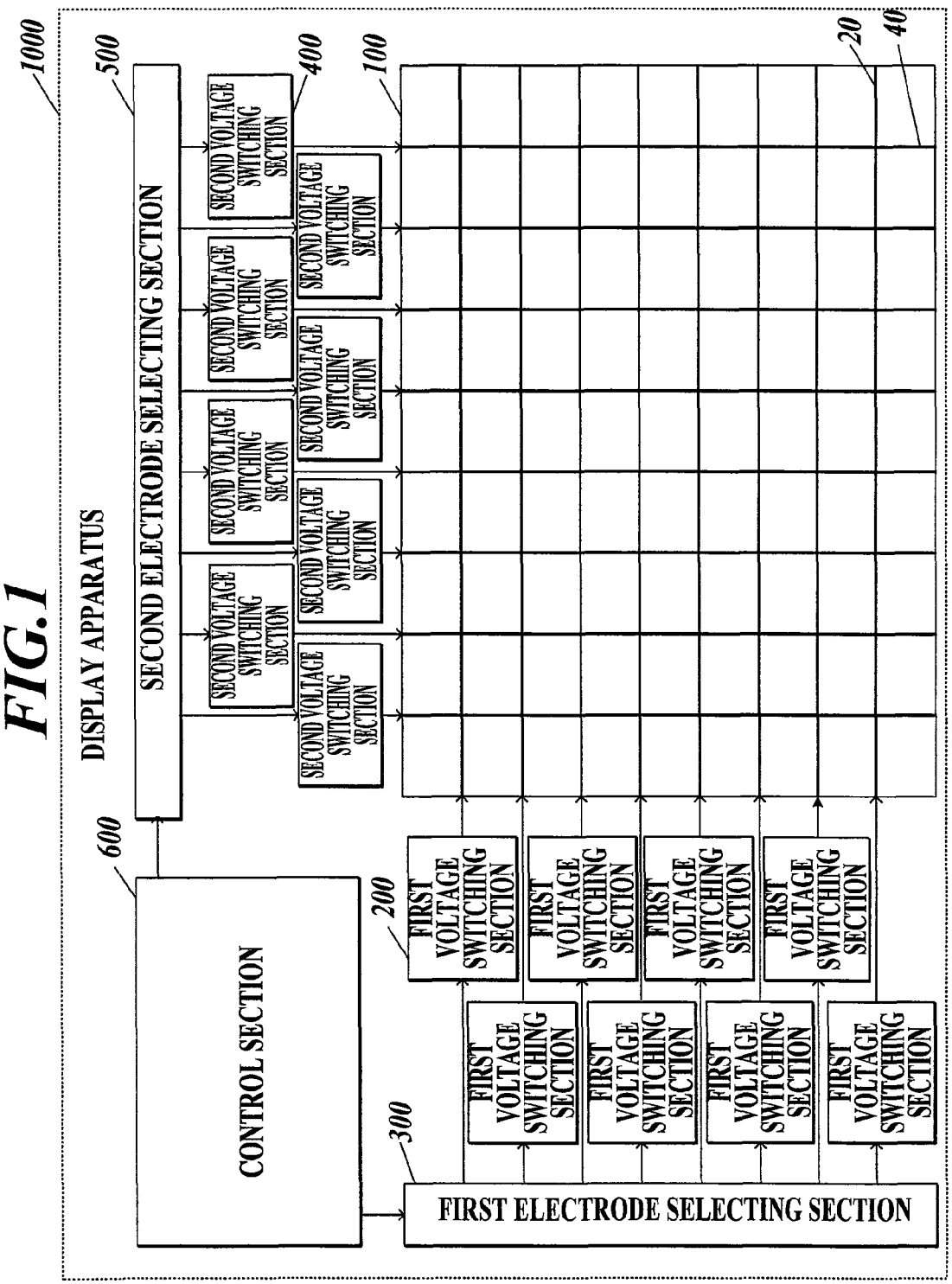
FIG. 1 is a block diagram showing an example of the functional configuration of a display apparatus equipped with an electrochromic display device of the present embodiment.
Figure 2:
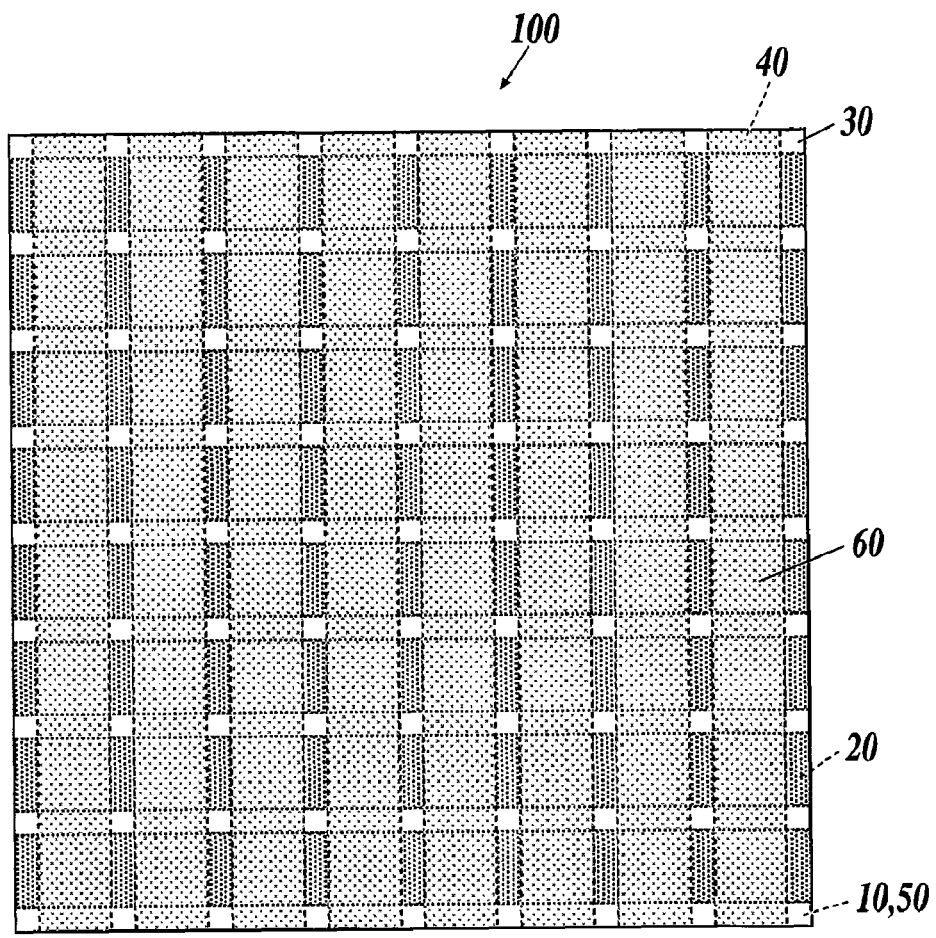
FIG. 2 is a plan view schematically showing an example of the electrochromic display device of the present embodiment.
Figure 3:
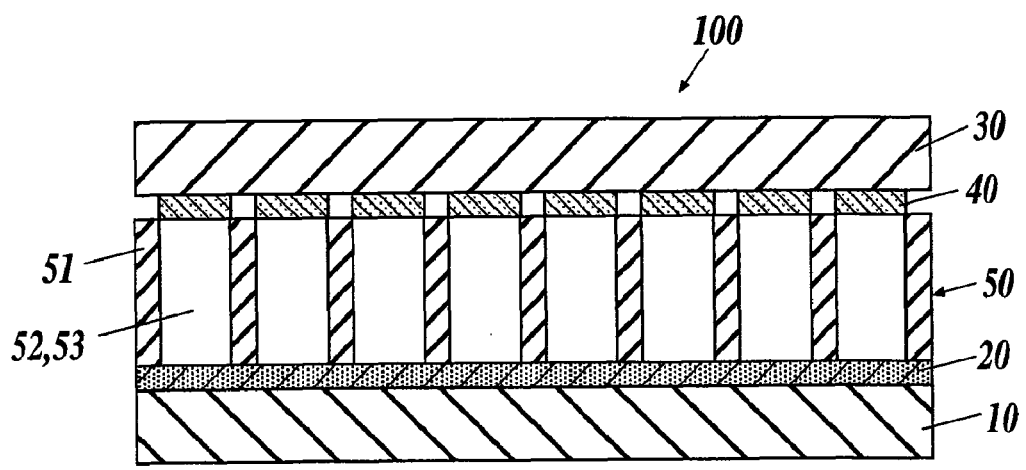
FIG. 3 is a sectional view showing the example of the electrochromic display device of the present embodiment.
Figure 4:
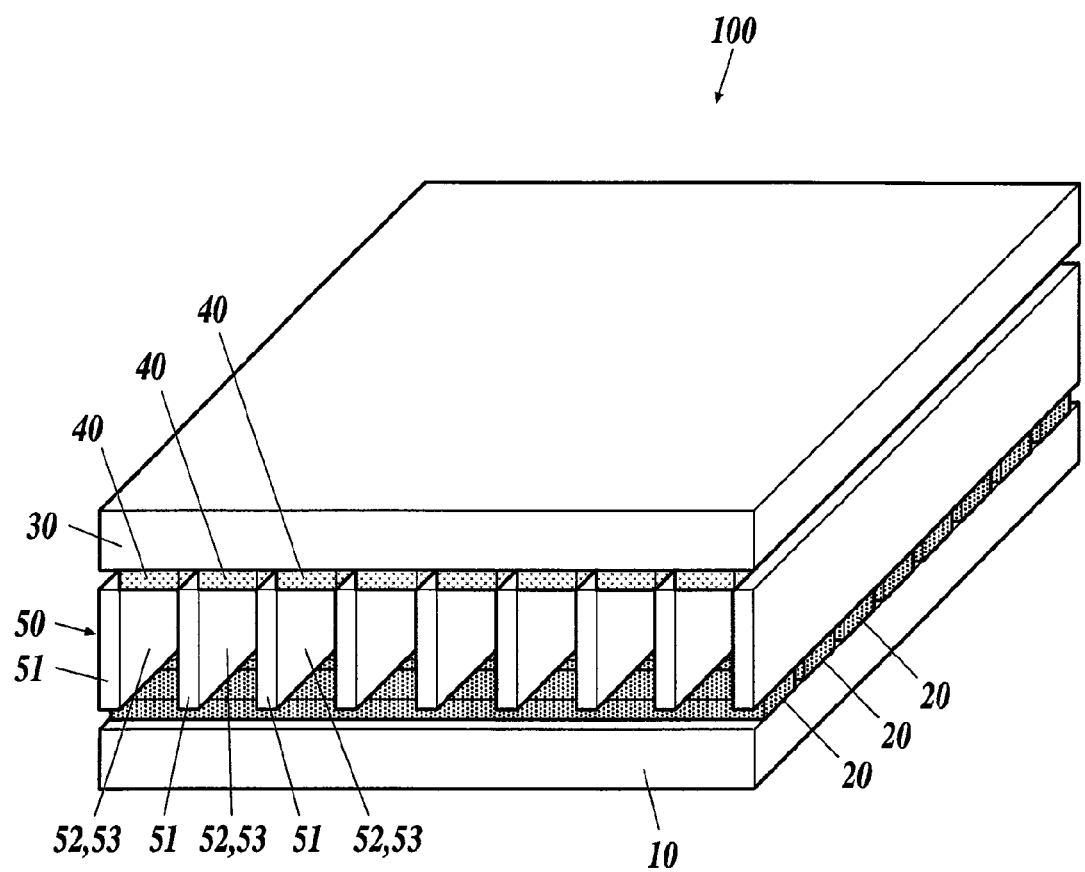
FIG. 4 is a front perspective view schematically showing the example of the electrochromic display device of the present embodiment.
Figure 5:
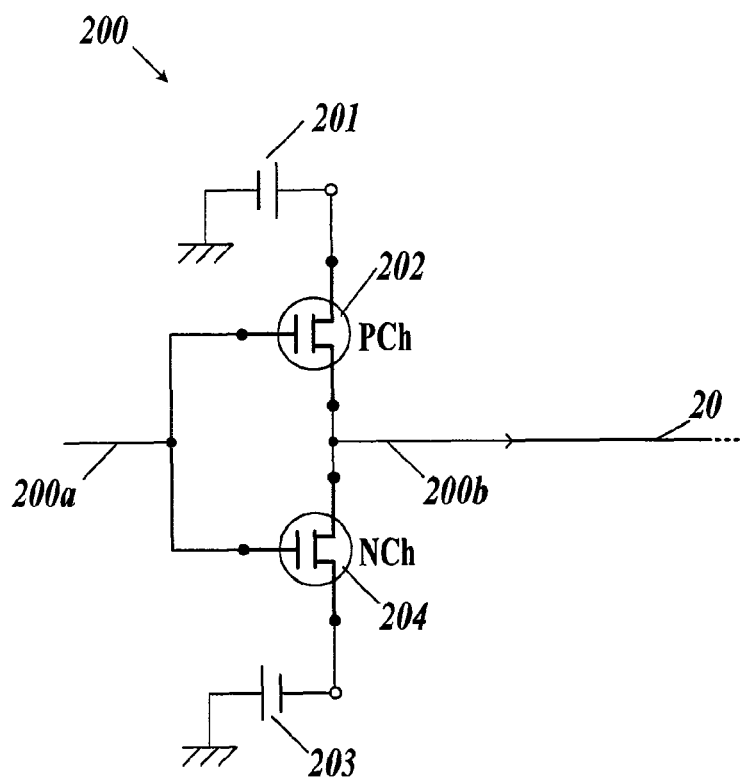
FIG. 5 is a diagram showing an example of the circuit configuration of a first voltage switching section provided in the display apparatus equipped with the electrochromic display device of the present embodiment.
Figure 6:
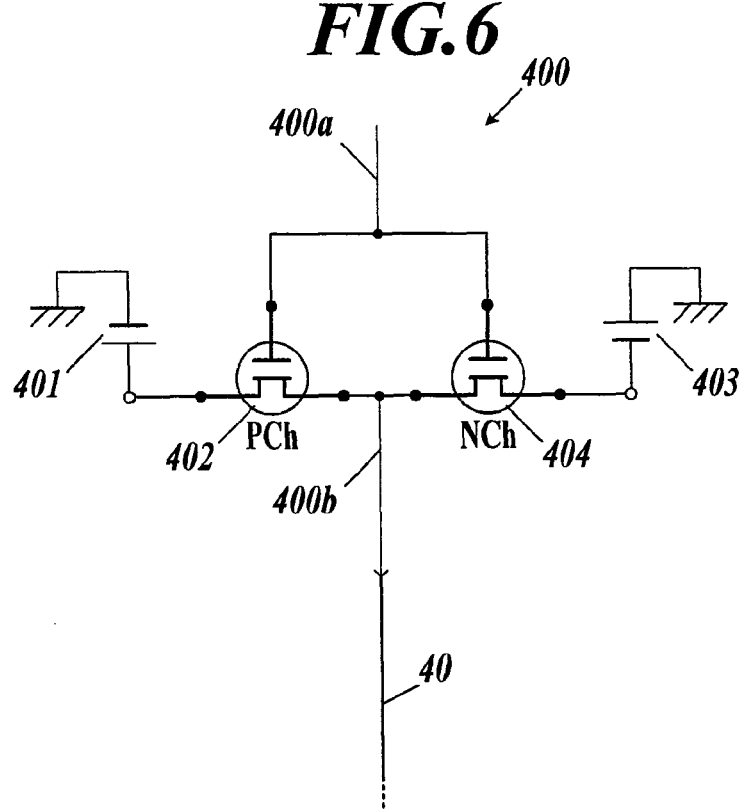
FIG. 6 is a diagram showing an example of the circuit configuration of a second voltage switching section provided in the display apparatus equipped with the electrochromic display device of the present embodiment.

FIG. 1 is a block diagram showing an example of the functional configuration of a display apparatus 1000 equipped with an electrochromic display device 100 of the present embodiment. FIG. 2 is a plan view schematically showing an example of the electrochromic display device 100 of the present embodiment. FIG. 3 is a sectional view schematically showing the example of the electrochromic display device 100 of the present embodiment. FIG. 4 is a front perspective view schematically showing the example of the electrochromic display device 100 of the present embodiment. FIG. 5 is a diagram showing an example of the circuit configuration of a first voltage switching section 200 provided in the display apparatus 1000. FIG. 6 is a diagram showing an example of the circuit configuration of a second voltage switching section 400 provided in the display apparatus 1000.

(Display Apparatus)

The display apparatus 1000 is the apparatus that is equipped with the electrochromic display device 100 and performs given display processing in accordance with image data input from the outside.

To put it concretely, for example, as shown in FIG. 1, the display apparatus 1000 includes the electrochromic display device 100, the first voltage switching sections 200, a first electrode selecting section 300, the second voltage switching sections 400, a second electrode selecting section 500, a control section 600, and the like.

(Electrochromic Display Device)

For example, as shown in FIGS. 2-4, the electrochromic display device 100 is the display device of a passive matrix drive that is composed of a first substrate 10, first electrodes 20 formed on the upper surface of the first substrate 10, a second substrate 30 provided above the first substrate 10 to be opposed to the first substrate 10, second electrodes 40 formed on the under surface of the second substrate 30, and an electrochromic composition layer 50 provided between the first substrate 10 and the second substrate 30.

The electrochromic display device 100 is adapted to execute a display by energizations between the first electrodes 20 and the second electrodes 40, and to execute the erasion of the display by the energizations in the directions reverse to those of the energizations for the display between the first electrodes 20 and the second electrodes 40.

The first electrodes 20 are, for example, a plurality of electrodes extending in parallel with each other. The second electrodes 40 are, for example, transparent display electrodes composed of a plurality of transparent electrodes extending in parallel with each other in the directions perpendicular to those of the first electrodes 20. Then, pixels 60 are formed in the regions in which the first electrodes 20 and the second electrodes 40 are in grade separated crossing.

The first substrate 10 is formed in, for example, a plane, and has the function of the base substance of the electrochromic display device 100.

The quality of material of the first substrate 10 is not especially limited as long as the material has an electrical insulation property. For example, glass and plastic can be used as the first substrate 10. As the glass, for example, the following kinds of glass can be given: soda-lime glass, low-alkali borosilicate glass, no-alkali borosilicate glass, no-alkali aminosilicate glass, and silica glass. Moreover, as the plastic, for example, the following kinds of plastic can be given: polyesters, such as polyethylene terephthalate and polyethylene naphtahalate; polyamides; polycarbonates; fluorinated polymers, such as polyvinylidene fluoride; polyethers; polyolefins, such as polystyrene and polyethylene; and polyimides.

It is preferable that the first substrate 10 looks white. Accordingly, when the quality of material of the first substrate 10 is glass or plastic, then it is possible to form the first substrate 10 that looks white by blending, for example, a white pigment, such as a titanium dioxide, a barium sulfate, and kaolin. Moreover, it is possible to form the first substrate 10 that looks white by applying the white pigment on the under surface of a transparent substrate, or by arranging a white sheet such as a sheet of white paper and a white polyethylene terephthalate (PET) sheet on the under surface.

The first electrodes 20 are formed in, for example, lines, each having a width, and are provided in stripes in parallel with each other at regular intervals.

The first electrodes 20 are provided on the upper surface of the first substrate 10 so as to contact with the electrochromic composition layer 50 and so as to be opposed to the second electrodes 40 with the electrochromic composition layer 50 put between the first and second electrodes 20 and 40.

The first electrodes 20 have the functions of energizing the electrochromic composition layer 50 by being paired with the second electrodes 40.

The first electrodes 20 form grade separated crossings with the second electrodes 40, that is, cross with the second electrodes 40 with intervals, and the pixels 60 are formed in the regions surrounded by the crossing points.

The first electrodes 20 are not especially limited, and may be transparent electrodes or opaque electrodes as long as the electrodes are oxidized in at least their surfaces. To put it concretely, as each of the first electrodes 20, for example, the followings can be given: an indium tin oxide (ITO) thin film; a thin film including a coated oxide film of $SnO_2$, $InO_2$, or the like; an ITO thin film doped by Sn or Sb; a thin film including a coated oxide film of $SnO_2$, $InO_2$, or the like, and doped Sn or Sb; a zinc oxide thin film; a magnesium oxide thin film; an aluminum oxide thin film; a chromium oxide thin film; a nickel oxide thin film; and a titanium oxide thin film. Moreover, the first electrodes 20 may be thin films each including a coated oxide film of an ITO, a zinc oxide, a magnesium oxide, an aluminum oxide, a chromium oxide, a nickel oxide, a titanium oxide, and the like.

The second substrate 30 is, for example, a transparent substrate formed in a plane, and has the function as a supporting body of the second electrodes 40.

The quality of material of the second substrate 30 is not especially limited as long as the material is the transparent substrate having an electrically insulation property. For example, glass and plastic can be used as the second substrate 30. As the glass, for example, the following kinds of glass can be given: soda-lime glass, low-alkali borosilicate glass, no-alkali borosilicate glass, no-alkali aminosilicate glass, and silica glass. Moreover, as the plastic, for example, the following kinds of plastic can be given: polyesters, such as polyethylene terephthalate and polyethylene naphtahalate; polyamides; polycarbonates; fluorinated polymers, such as polyvinylidene fluoride; polyethers; polyolefins, such as polystyrene and polyethylene; and polyimides.

The second electrodes 40 are, for example, transparent electrodes formed in lines, each having a width, and are provided in stripes parallel to each other at regular intervals.

The second electrodes 40 are provided on the under surface of the second substrate 30 so as to contact with the electrochromic composition layer 50 and so as to be opposed to the first electrodes 20 with the electrochromic composition layer 50 put between the second electrode 40 and the first electrodes 20.

The second electrodes 40 have the functions of energizing the electrochromic composition layer 50 by being paired with the first electrodes 20.

The second electrodes 40 form grade separated crossings with the first electrodes 20, that is, cross with the first electrodes 20 with intervals, and the pixels 60 are formed in the regions surrounded by the crossing points.

The second electrodes 40 are not especially limited as long as the second electrodes 40 may be the transparent electrodes oxidized in at least their surfaces. To put it concretely, as each of the second electrodes 40, for example, the followings can be given: an ITO thin film; a thin film including a coated oxide film of $SnO_2$, $InO_2$, or the like; an ITO thin film containing doped Sn or Sb; a thin film containing a coated oxide film of $SnO_2$, $InO_2$, or the like and doped Sn or Sb; a zinc oxide thin film; and a magnesium oxide thin film. Moreover, the second electrodes 40 may be thin films, each including a coated oxide film or the like of an ITO, a zinc oxide, a magnesium oxide, an aluminum oxide, a chromium oxide, a nickel oxide, a titanium oxide, and the like.

The electrochromic composition layer 50 includes, for example, a plurality of insulative partition walls 51 and electrochromic compositions 52. The insulative partition walls 51 are arranged between the second electrodes 40 adjoining each other, and extend in parallel with each other in the directions perpendicular to those of the first electrodes 20. The electrochromic compositions 52 are introduced between the insulative partition walls 51 adjoining each other.

The insulative partition walls 51 have the roles of intercepting the potential differences generated between the second electrodes 40 at the time of driving the electrochromic display device 100.

Moreover, the insulative partition walls 51 have the roles of holding the electrochromic compositions 52 of fixed volumes between the first substrate 10 and the second substrate 30. That is, the insulative partition walls 51 have the roles of supporting the electrochromic compositions 52 between the first substrate 10 and the second substrate 30 by including the electrochromic compositions 52, and the roles of spacers for controlling the quantities of the electrochromic compositions 52 to be uniform by the thicknesses of the insulative partition walls 51.

The heights of the insulative partition walls 51 (the lengths in the vertical directions) are not especially limited, but it is possible to effectively manifest the display functions of the electrochromic compositions 52 by setting the heights of the insulative partition walls 51 to be preferably within a range of 10-500 μm, or more preferably within a range of 30-200 μm.

The thicknesses of the insulative partition walls 51 are arbitrary as long as the thicknesses are equal to or less than the distances between the second electrodes 40.

The insulative partition walls 51 are not especially limited as long as the insulative partition walls 51 are the ones that can be produced by the use of, for example, a screen printing method, a photolithographic method, or an ink jet method.

The qualities of materials of the insulative partition walls 51 are not especially limited as long as the materials are the ones that have polar solvent-resistance properties and electrical insulation properties, and, for example, the following materials can be given: glass paste; a heat curable epoxy resin; a light curable epoxy resin; and a water soluble resin, such as polyvinyl alcohol.

As the glass paste, for example, the followings can be given: AP dielectric pastes AP5346G and AP5695BD available from Asahi Glass Co., Ltd.; and glass paste PLS-3124 and granulated glass LS-0241, both available from Nippon Electric Glass Co., Ltd. But the glass paste is not limited to the ones mentioned above.

As the heat curable epoxy resin, for example, the followings can be given: a single-liquid type epoxy resin (specifically, for example, 2217, 2217B, 2219D, TB2235, TB2285 of ThreeBond 2200 series available from ThreeBond Co., Ltd.), but the heat curable epoxy resin is not limited to the one mentioned above.

When the insulative partition walls 51 having fine structures are required, then it is preferable to produce the insulative partition walls 51 by the use of a photolithographic method.

Even when the insulative partition walls 51 are produced by the use of the photolithographic method, the qualities of materials of the insulative partition walls 51 are not especially limited as long as the materials have polar solvent-resistance properties and electric insulation properties, and, for example, permanent photoresist for MEMS TMMRS-2000 available from Tokyo Ohka Kogyo Co., Ltd., which enables the obtainment of the insulative partition walls 51 having high aspect ratios by one time exposure, can be given as a preferable material, but the materials of the insulative partition walls 51 are not limited the one mentioned above.

Each of the electrochromic compositions 52 contains a supporting electrolyte, a polar solvent, and a leuco dye.

Then, display quality deterioration inhibitors (compounds, each having a hydroquinone derivative and/or a catechol derivative, a ferrocene derivative, and a carbonyl group) for inhibiting the deterioration of the display quality of the electrochromic display device 100, and adsorbents 53 adsorbing the leuco dyes at the time of energizations for the erasions between the first electrodes 20 and the second electrodes 40 are added to the electrochromic compositions 52.

Moreover, as a component capable of being added to each of the electrochromic compositions 52, for example, a polymer compound for adjusting the physical properties (such as thickening) of each of the electrochromic compositions 52 can be given.

Each of the electrochromic compositions 52 has the function of the coloring and the erasing of a display of the electrochromic display device 100.

To put it concretely, the electrochromic compositions 52 perform the coloring by the energizations between the first electrodes 20 and the second electrodes 40, and performing the erasing by the energizations in the directions reverse to those of the energizations for the coloring or by intercepting the energizations for the coloring.

Each of the electrochromic compositions 52 has only to have fluidity, and may be, for example, in the form of a liquid having low viscosity, in the form of paste having high viscosity, or in the form of a gel having small fluidity.

The supporting electrolytes, which are constituents of the electrochromic compositions 52, have the functions of making currents easy to flow through the electrochromic compositions 52. The supporting electrolytes contain compounds generally called molten salts. Each of the supporting electrolytes may use each compound individually, or may use a plurality of compounds in a mixed state.

It is preferable to add the supporting electrolytes so as to be 0.01-20 weight % of the whole weight of the electrochromic compositions 52, and it is more preferable to add the supporting electrolytes so as to be 0.1-20 weight % of the whole weight in order to manifest the aforesaid function sufficiently.

To put it concretely, the supporting electrolytes are not especially limited as long as the supporting electrolytes are the ones having the aforesaid functions, and, for example, the compounds of the general formula expressed by the following formula (1) and/or the compounds of the general formula expressed by the following formula (2) can be given.

$$M_1X_1 \quad (1)$$

(In the formula, $M_1$ denotes Li, Na, K, Rb, Cs, or $NH_4$, and $X_1$ denotes $ClO_4$, $BF_4$, $CF_3SO_3$, or $PF_6$.)

$$(R_a)_n(R_b)_mNX_2 \quad (2)$$

(In the formula, $R_a$ denotes an alkyl group or an aryl group, $R_b$ denotes an alkyl group, N denotes a nitrogen atom, $X_2$ denotes Cl, Br, I, $ClO_4$, $BF_4$, $CF_3SO_3$, or $PF_6$, n denotes 0, 1, or 2, and m denotes 4−n.)

In the following, the examples of the compounds of the general formula expressed by the aforesaid formula (1) and the compounds of the general formula expressed by the aforesaid formula (2) will be shown, but these examples are illustrations and do not limit the scope of the supporting electrolytes.

As the concrete examples of the compounds of the general formula expressed by the aforesaid formula (1), for example, $NaClO_4$, $LiClO_4$, $KClO_4$, $RbClO_4$, $CsClO_4$, $NH_4ClO_4$, $LiBF_4$, and $LiPF_6$ can be given.

Moreover, as the concrete examples of the compounds of the general formula expressed by the aforesaid formula (2), for example, $(CH_3)_4NClO_4$, $(C_2H_5)_4NClO_4$, $(n-C_4H_9)_4NClO_4$, $(CH_3)_4NBF_4$, $(C_2H_5)_4NBF_4$, $(n-C_4H_9)_4NBF_4$, $(CH_3)_4NCl$, $(C_2H_5)_4NCl$, $(CH_3)_4NBr$, $(C_2H_5)_4NBr$, $(n-C_4H_9)_4NBr$, $(n-C_4H_9)_4NI$, $C_6H_5(CH_3)_3NClO_4$, $C_6H_5(C_2H_5)_3NClO_4$, $C_8H_{17}(CH_3)_3NClO_4$, $(C_2H_5)_4NPF_6$, $(n-C_4H_9)_4NPF_6$, $(CH_3)_4NCF_3SO_3$, and $(C_2H_5)_4NCF_3SO_3$ can be given.

The polar solvent, which is a constituent of each of the electrochromic compositions 52, is at least a kind of organic solvents using supporting electrolytes and exhibiting energization properties, and has the function of accelerating the erasing of the colored leuco dye by intercepting a voltage and/or a current. Moreover, the polar solvent also fulfills the function of the solvent of a polymer compound when the polymer compound is added to each of the electrochromic compositions 52. As the polar solvent, various polar solvents may be individually used, or two kinds or more of polar solvents may be used in suitable combinations with each other.

In the following, the examples of suitable polar solvents will be shown, but these examples are illustrations, and do not limit the scope of the polar solvents.

As the concrete examples of the polar solvents, for example, the followings can be given: N-methylpyrrolidone, dimethylformamide, diethylformamide, N,N-diethylacetamide, propylene carbonate, dimethyl sulfoxide, γ-butyrolactone, acetonitrile, propionitrile, and butyronitrile. Although any of the illustrated polar solvents is preferable as the polar solvents to be used for one of the constituents of the electrochromic compositions 52, N,N-diethylacetamide can be given as the especially preferable polar solvent.

The leuco dye, one of the constituents of each of the electrochromic compositions 52, is a colorless or light-colored electron donative precursor of a dye, and is a compound to be colored by a developer, such as a phenolic compound, an acidic substance, or an electron-accepting substance.

As the leuco dye, for example, the compounds which include lactone, lactam, sultone, spiropyran, ester, or an amide structure at their partial skeletons and can be practically colorless can be given. To put it concretely, for example, a triarylmethane compound, a bis-phenyl methane compound, a xanthenes compound, a fluoran compound, a thiazine compound, and a spiropyran compound can be given, but the leuco dye is not limited to the ones mentioned above.

The leuco dye can perform the coloring of various colors by being suitably selected among the compounds mentioned above. Consequently, the display color of the electrochromic display device 100 using the leuco dyes can be suitably selected on the basis of the leuco dyes. To put it concretely, for example, in the case of using the leuco dyes coloring to be black, a black-and-white display and a gray display can be performed.

Because the blending quantities of the leuco dyes depend on the solubility of the leuco dyes, it is difficult to unconditionally express the blending quantities, but it is necessary that sufficient quantities of the leuco dyes for coloring are blended. In the case of the leuco dyes having small solubility, it is preferable to adjust the blending quantities of the leuco dyes by, for example, enlarging the volumes (the heights of the insulative partition walls 51) of the electrochromic composition layer 50 corresponding to the respective pixels 60 so that necessary quantities may be included.

In the following, the examples of the leuco dyes will be shown in a classified state based on their colors, but those are illustrations and do not limit the scope of the leuco dyes.

The following formulae (3) and (4) express the leuco dyes coloring in yellow.

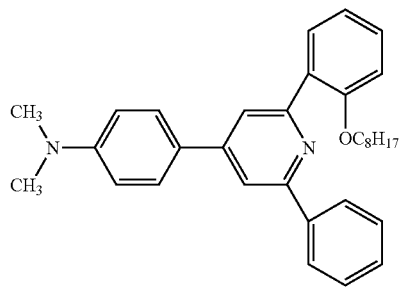

(3)

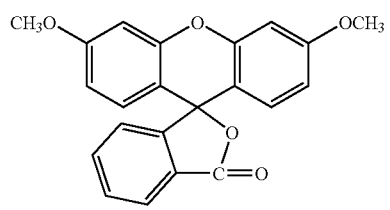

(4)

The following formulae (5)-(7) express the leuco dyes coloring in magenta.

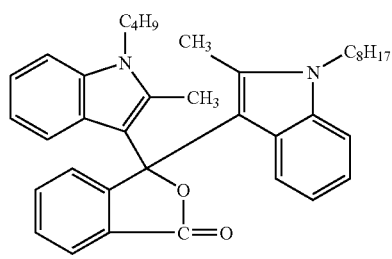

(5)

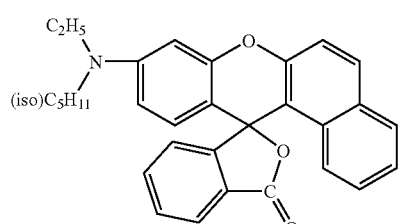

(6)

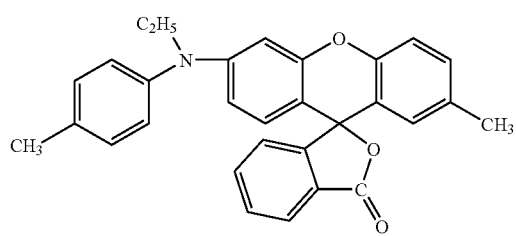

(7)

The following formulae (8)-(11) express the leuco dyes coloring in cyan.

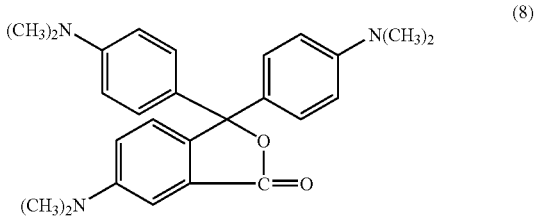

(8)

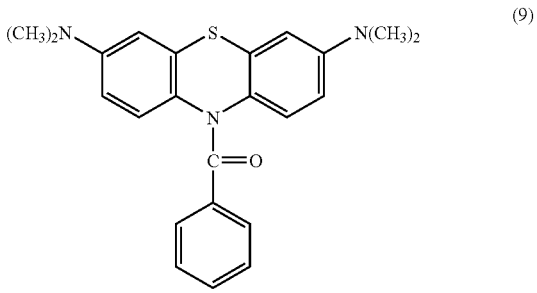

(9)

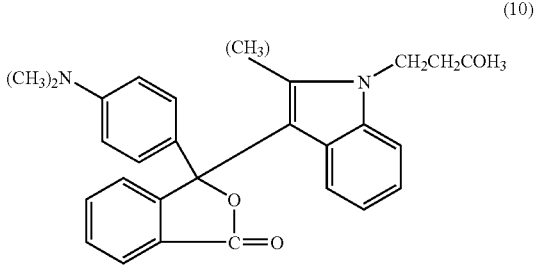

(10)

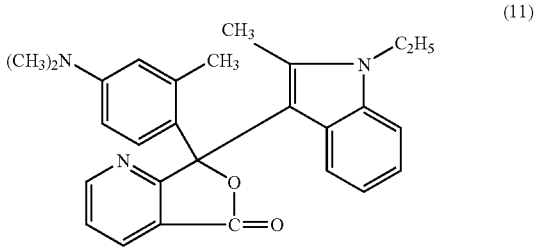

(11)

The following formulae (12) and (13) express the leuco dyes coloring in red.

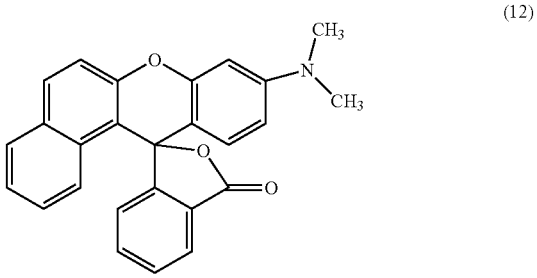

(12)

-continued

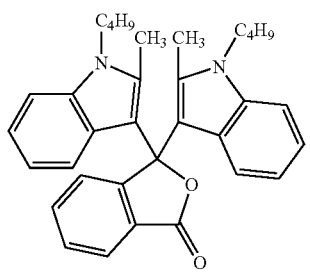
(13)

The following formula (14) expresses the leuco dyes coloring in blue.

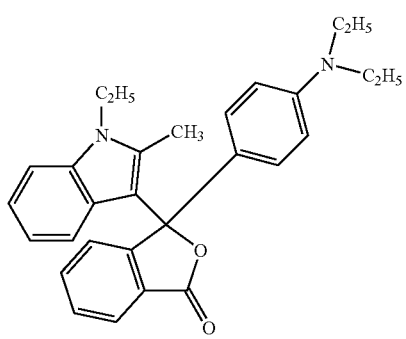
(14)

The following formulae (15) and (16) express the leuco dyes coloring in black.

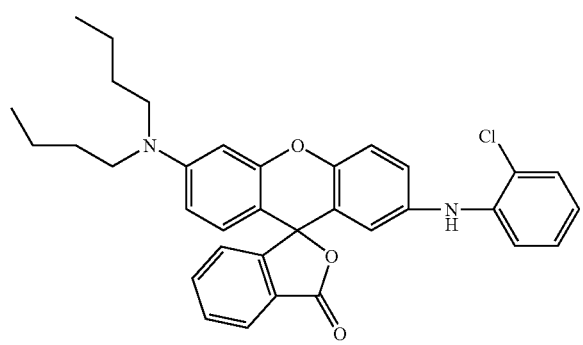
(15)

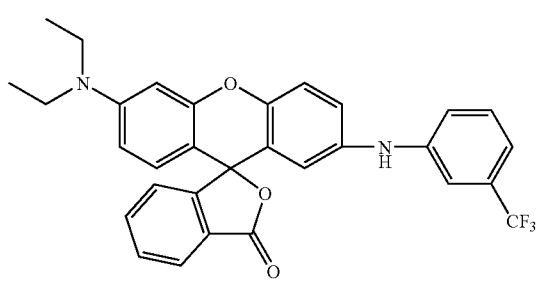
(16)

The display quality deterioration inhibitors to be added to the electrochromic compositions 52 are compounds having the functions of suppressing the deteriorations of the display quality of the electrochromic display device 100 accompanying the repetition operations of the coloring and the erasing of the leuco dyes.

The addition quantities of the display quality deterioration inhibitors are preferably 1-20 weight % of the contained quantities of the leuco dyes, and the addition quantities are more preferably 5-20 weight % in order to manifest the aforesaid functions sufficiently.

Each of the display quality deterioration inhibitors is a mixture of a first display quality deterioration suppressing compound (the compound (hydroquinone derivative) expressed by the following general formula (17) and/or the compound (catechol derivative) expressed by the following general formula (18)) and a second display quality deterioration suppressing compound (the compound (ferrocene derivative) expressed by the following general formula (34)), and a third display quality deterioration suppressing compound (the compound containing a carbonyl group).

The hydroquinone derivative is a compound expressed by the following general formula (17), and the catechol derivative is a compound expressed by the following general formula (18). Each of the electrochromic compositions 52 has only to contain either of the hydroquinone derivative and the catechol derivative. That is, each of the electrochromic compositions 52 may contain only the hydroquinone derivative, may contain only the catechol derivative, or may contain both of the hydroquinone derivative and the catechol derivative.

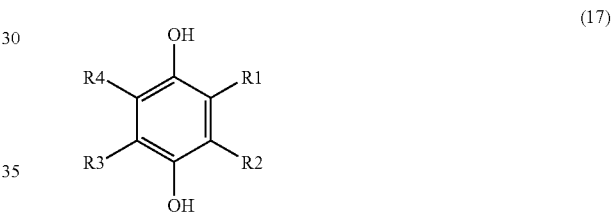
(17)

(In the formula, each of R1, R2, R3, and R4 denotes any of a hydrogen atom, an alkyl group, an aryl group, an alkoxy group, a hydroxyl group, a nitro group, an alkylcarbonyl group, a formyl group, a carboxyl group, and an alkoxycarbonyl group. Alternatively, in the formula, R1 and R2, and/or R3 and R4 may mutually condense to form a 5 or 6 member condensed ring.)

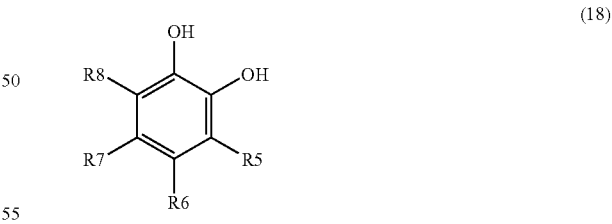
(18)

(In the formula, each of R5, R6, R7, and R8 denotes any of a hydrogen atom, an alkyl group, an alkoxy group, an aryl group, a hydroxyl group, a nitro group, an alkylcarbonyl group, a formyl group, a carboxyl group, and an alkoxycarbonyl group. Alternatively, in the formula, R5 and R6, R6 and R7, and/or R7 and R8 may mutually condense to for a 5 or 6 member condensed ring.)

The examples of the hydroquinone derivative will be shown in the following formulae (19)-(26), but those are illustrations, and the scope of this compound is not limited to the following examples.

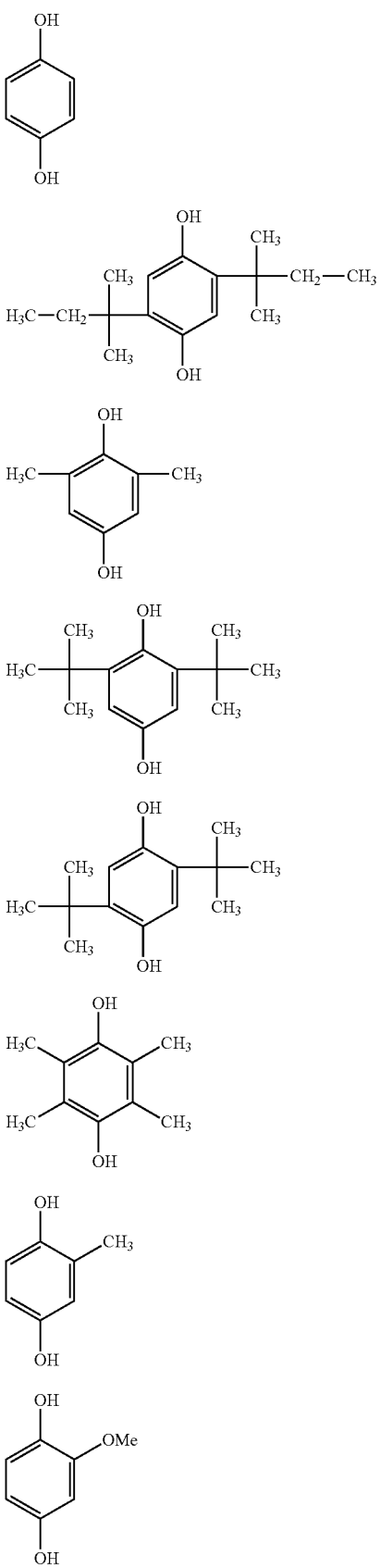
The examples of the catechol derivative will be shown in the following formulae (27)-(33), but those are illustrations, and the scope of this compound is not limited to the examples.
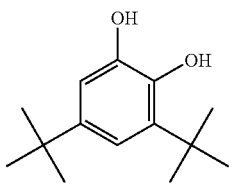 (27)
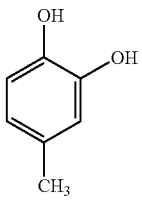 (28)
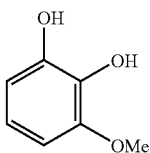 (29)
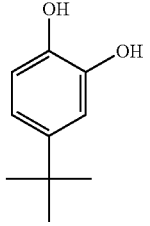 (30)
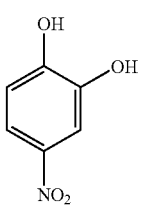 (31)
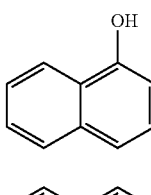 (32)
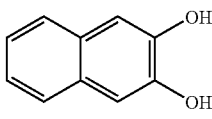 (33)

The ferrocene derivative is a compound expressed by the following general formula (34).

(34)
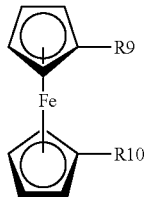

(In the formula, each of R9 and R10 denotes any of a hydrogen atom, a bromine atom, a linear or branched chain alkyl group, a methylol group, 1 or 2 ethylol group, a phenyl group, a cyclopentenyl group, a diphenylphosphino group, an amino group, and an alkylated amino group. In the formula, Fe denotes an iron atom.)

In the following, the examples of the ferrocene derivative will be shown by the formulae (35)-(43), but those are illustrations, and the scope of this compound is not limited to the examples.

(35)
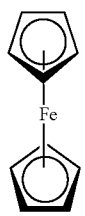

(36)
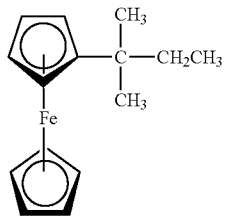

(37)
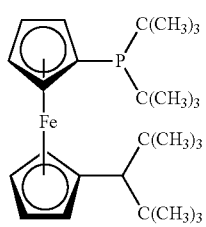

(38)
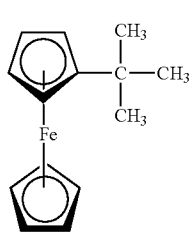

(39)
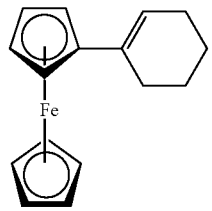

(40)
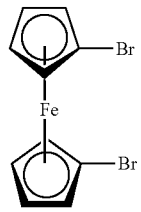

(41)
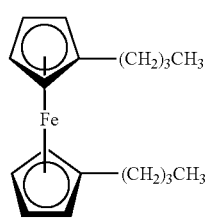

(42)
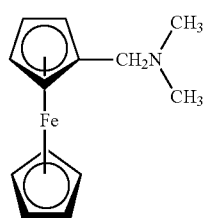

(43)
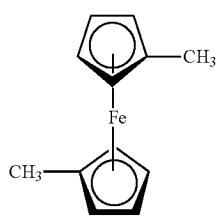

The compounds having the carbonyl groups are, for example, an acetophenone derivative and/or a dibenzoyl derivative. Each of the electrochromic compositions 52 has only to contain at least either of the acetophenone derivative and the dibenzoyl derivative. That is, each of the electrochromic compositions 52 may contain only the acetophenone derivative, may contain only the dibenzoyl derivative, or may contain both of the acetophenone derivative and the dibenzoyl derivative.

In the following, the examples of the acetophenone derivative will be shown by the formulae (44)-(56), but those are illustrations and the scope of this compound is not limited to the examples.

(44)
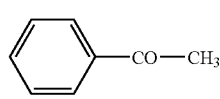

-continued

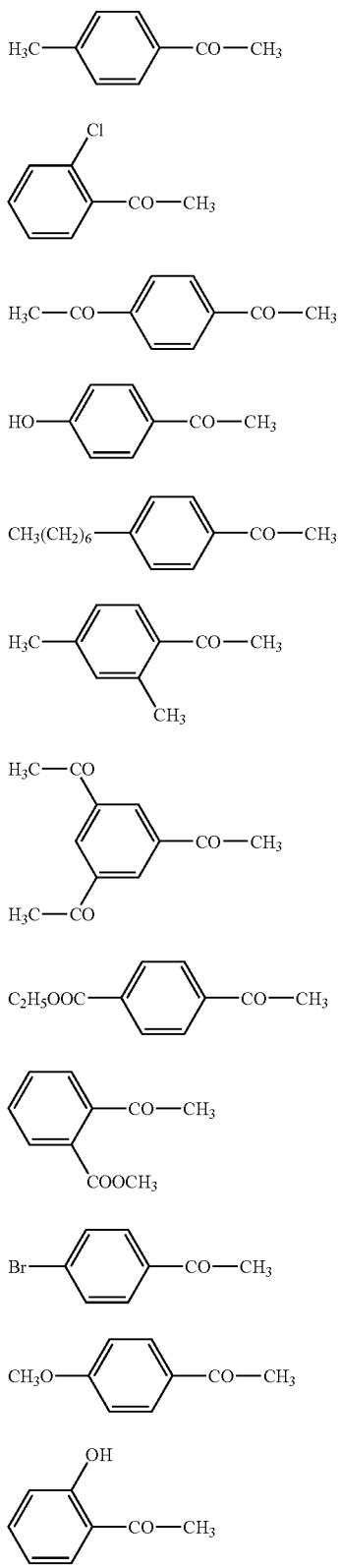

The examples of the dibenzoyl derivative will be shown by the following formulae (57)-(60), but those are illustrations, and the scope of this compound is not limited to the examples.

Each of the adsorbents 53 to be added to the electrochromic compositions 52 is, for example, an aluminum oxide and/or an aluminum hydroxide.

The modes of the adsorbents 53 (aluminum oxides and/or aluminum hydroxides) are not especially limited, but it is preferable to add the adsorbents 53 into the electrochromic compositions 52 in the state of powder, to disperse the adsorbents 53 to be uniform by means of ultrasonic waves, a ball mill, or a homogenizer, such as a homomixer, and to use the adsorbents 53 as a dispersion liquid of the solution of the electrochromic compositions 52.

The addition quantity of each of the adsorbents 53 varies according to the activity ratios, the particle diameters, and the like of the aluminum oxide and/or the aluminum hydroxide to be used.

Any of an aluminum oxide having a small surface area, such as alpha alumina, a large aluminum oxide having a particle diameter of 10 μm or more, an aluminum hydroxide having a small surface area, and an aluminum hydroxide having a particle diameter of 10 μm or more has a small adsorption effect of the leuco dyes, and accordingly it is preferable to add 0.5-5 grams of each of them to 1 gram of the leuco dye in order to manifest a sufficient adsorption operation, and is more preferable to add 1-3 grams of each of them.

Moreover, any of an aluminum oxide having a large surface area, such as gamma alumina, a small aluminum oxide having a particle diameter of 1 μm or less, an aluminum hydroxide having a large surface area, and an aluminum hydroxide having a small particle diameter of 1 μm or less has a large adsorption effect of the leuco dyes, and consequently the addition of 0.1-0.5 gram of each of them to 1 gram of the leuco dye manifests a sufficient adsorption operation.

Moreover, the class of activated alumina to be used for thin-layer chromatography or the like manifests a sufficient adsorption operation by adding 0.1-0.5 gram of the activated alumina to 1 gram of the leuco dye even when the activated alumina includes large particles each having a particle diameter of several tens μm.

The adsorbents 53 (aluminum oxides and/or aluminum hydroxides) adsorbing the leuco dyes can be easily obtained by commercially available products.

In the following, examples of the suitable commercially available adsorbents 53 will be shown, but those are illustrations, and do not limit the scope of the adsorbents 53.

As the concrete examples of the commercially available adsorbents 53, for example, the followings can be given: aluminum oxide 60G Neutral for thin-layer chromatography (having particle diameters of 4-50 μm) available from Merk & Co., Inc.; low soda alumina LS235 (particle diameter of 0.47

μm), activated alumina C200 (particle diameter of 4.4 μm), and aluminum hydroxide B1403 (particle diameter of 1.5 μm), all available from Nippon Light Metal Co., Ltd.; and gamma alumina KC501 (particle diameter of 1 μm) available from Sumitomo Chemical Co., Ltd.

Each of the polymer compounds to be added to the electrochromic compositions 52 has the function of heightening the viscosity of the electrochromic compositions 52 to make the handling of them easily. Various polymer compounds may be used individually, or two kinds or more of the polymer compounds may be combined with each other to be used.

The polymer compounds are used for heightening the viscosity of the electrochromic compositions 52, and the properties of the electrochromic compositions 52 in this case can be made to be in the forms of liquids having low viscosity, paste having high viscosity, and gels having small fluidity.

The preferable blending quantities of the polymer compounds are 0.1-80 weight % of all the weights of the electrochromic compositions 52.

In the following, examples of suitable polymer compounds will be shown, but those are illustrations, and do not limit the scope of the polymer compounds.

As the concrete examples of the polymer compounds, for example, the followings can be given: a polyvinylidene fluoride; a polyvinylidene chloride; a polyalkylene oxide such as a polyethylene oxide; a polymer molecule having repeating units of polyalkylene imine and polyalkylene sulfide; polymethyl methacrylate; polyacrylonitrile; polycarbonate; and a polyvinyl formal such as polyvinyl butyral. As the especially preferable polymer compounds, polyvinyl butyral and polyvinylidene fluoride can be given.

The electrochromic compositions 52 described above are examples, and the other compositions introduced between the insulative partition walls 51 can be used as the electrochromic composition layer 50 as long as the compositions can be electrochemically colored.

Next, an example of the manufacturing method of the electrochromic display device 100 will be described.

The manufacturing method of the electrochromic display device 100 includes the following processes [1]-[4].

[1] First Vapor Deposition Process

The first vapor deposition process is the process of forming the first electrodes 20 on the surface of the first substrate 10 on one side thereof. The first electrodes 20 are formed as a film by a publicly known vapor deposition method, a plating method, a sputtering method, and the like, and are next patterned by a photolithographic method. Then, the first electrodes 20 are formed in stripes by an etching method.

[2] Second Vapor Deposition Process

The second vapor deposition process is the process of forming the second electrodes 40 on the surface of the second substrate 30 on one side thereof. The second electrodes 40 are formed as a film by the publicly known vapor deposition method, the plating method, the sputtering method, and the like, and are next patterned by the photolithographic method. Then, the second electrodes 40 are formed in stripes by the etching method.

[3] Insulative Partition Wall Installing Process

The insulative partition wall installing process is the process of installing the insulative partition walls 51 between the first substrate 10, on which the first electrodes 20 are formed, and the second substrate 30, on which the second electrodes 40 are formed.

To put it concretely, for example, the insulative partition walls 51 are installed by the screen-printing of glass paste (for example, glass paste PLS-3124 available from Nippon Electric Glass Co., Ltd.) on the surface of the first substrate 10 on which the first electrodes 20 are formed and/or the surface of the second substrate 30 on which the second electrodes 40 are formed.

Alternatively, the insulative partition walls 51 are formed to be installed by giving, for example, permanent photoresist for MEMS TMMRS-2000 available from Tokyo Ohka Kogyo Co., Ltd. on the surface of the first substrate 10 on which the first electrodes 20 are formed and/or the surface of the second substrate 30 on which the second electrodes 40 are formed by, for example, a spinner, and next by three-dimensionally forming the permanent photoresist TMMRS-2000 in a pattern with a predetermined mask by the photolithographic method.

[4] Pasting Process

The pasting process is the process of pasting the first substrate 10, on which the first electrodes 20 are formed, and the second substrate 30, on which the second electrodes 40 are formed, with the electrodes 20 and 40 put on the insides, to enclose the electrochromic compositions 52 to which predetermined additives (display quality deterioration inhibitors, adsorbents 53, polymer compounds, and the like) are added.

To put it concretely, the electrochromic composition layer 50 is formed by, for example, introducing the electrochromic compositions 52, to which the predetermined additives are added, between the insulative partition walls 51 adjoining each other among the insulative partition walls 51 installed on either substrate (for example, the first substrate 10, on which the first electrodes 20 are formed), and then the other substrate (for example, the second substrate 30, on which the second electrodes 40 are formed) is pasted to the electrochromic composition layer 50.

Alternatively, for example, the first substrate 10, on which the first electrodes 20 are formed, and the second substrate 30, on which the second electrodes 40 are formed, are pasted together in the state in which the insulative partition walls 51 are installed, and the electrochromic compositions 52 containing the predetermined additives are introduced between the insulative partition walls 51 adjoining each other in the gap between the two substrates 10 and 30 with a pipette or the like.

Alternatively, for example, the first substrate 10, on which the first electrodes 20 are formed, and the second substrate 30, on which the second electrodes 40 are formed, are pasted together in the state in which the insulative partition walls 51 are installed, and glass capillaries or the like are separately formed in advance between the insulative partition walls 51 adjoining each other in the gap, in which the insulative partition walls 51 are installed between the two substrates 10 and 30. Then, the electrochromic compositions 52 to which the predetermined additives are added are enclosed by being absorbed between the insulative partition walls 51 adjoining each other by the glass capillaries or the like.

Incidentally, the aforesaid manufacturing method of the electrochromic display device 100 is an example, and the manufacturing method is not limited to the above one.

(First Voltage Switching Section)

The display apparatus 1000 includes the plurality of first voltage switching sections 200 (for example, the same number as that of the first electrodes 20 included in the electrochromic display device 100), for example, as shown in FIG. 1.

Each of the first voltage switching sections 200 switches, for example, a voltage applied to the first electrode 20 connected to the first voltage switching section 200 between a positive voltage and a negative voltage.

To put it concretely, for example, as shown in FIG. 5, each of the first voltage switching sections 200 includes a first positive voltage power source 201 outputting a positive voltage (for example, +VL=0 V to +1 V), a first P channel transistor 202 functioning as a switch, a first negative voltage power source 203 outputting a negative voltage (for example, −VH=−10 V to −3 V), a first N channel transistor 204 functioning as a switch, and the like.

The first positive voltage power source 201 is adapted to be turned on and off by, for example, the first electrode selecting section 300. When the first positive voltage power source 201 is turned on, the positive voltage is applied to one end (source) of the first P channel transistor 202.

The first P channel transistor 202 includes, for example, a gate connected to a gate terminal 200a, the one end (source) connected to the first positive voltage power source 201, and the other end (drain) connected to an output terminal 200b connected to the corresponding first electrode 20 of the electrochromic display device 100.

The first negative voltage power source 203 is adapted to be turned on and off by, for example, the first electrode selecting section 300. When the first negative voltage power source 203 is turned on, the negative voltage is applied to one end (source) of the first N channel transistor 204.

The first N channel transistor 204 includes, for example, a gate connected to the gate terminal 200a, the one end (source) connected to the first negative voltage power source 203, and the other end (drain) connected to the output terminal 200b connected to the corresponding first electrode 20 of the electrochromic display device 100.

(First Electrode Selecting Section)

The first electrode selecting section 300 applies positive voltages and negative voltages to the first electrodes 20 (line electrodes) by controlling the first voltage switching sections 200 in conformity with, for example, control signals input from the control section 600.

To put it concretely, the first electrode selecting section 300, for example, applies a predetermined positive voltage to the gate terminal 200a of one of the first voltage switching sections 200, and turns on the first positive voltage power source 201 of the first voltage switching section 200. Thereby, the predetermined positive voltage is applied to the gate of the first P channel transistor 202 of the first voltage switching section 200, and the positive voltage from the first positive voltage power source 201 is applied to the one end (source) of the first P channel transistor 202. Consequently, the first channel transistor 202 is turned on, and the positive voltage is applied to the corresponding first electrode 20 through the output terminal 200b of the first voltage switching section 200.

On the other hand, the first electrode selecting section 300, for example, applies a predetermined negative voltage to the gate terminal 200a of the first voltage switching section 200, and turns on the first negative voltage power source 203 thereof. Thereby, the predetermined negative voltage is applied to the gate of the first N channel transistor 204 of the first voltage switching section 200, and the negative voltage from the first negative voltage power source 203 is applied to the one end (source) of the first N channel transistor 204. Consequently, the first N channel transistor 204 is turned on, and the negative voltage is applied to the corresponding first electrode 20 through the output terminal 200b.

In the following, "applying the positive voltage (second positive voltage) to the first electrode 20" will be sometimes expressed as "not selecting the first electrode 20," and "applying the negative voltage (first negative voltage) to the first electrode 20" will be sometimes expressed as "selecting the first electrode 20."

To put it more concretely, the first electrode selecting section 300 selects the first electrodes 20 in the order of the one in a first row (for example, the uppermost first electrode 20 in FIG. 1)→the one in a second row→the one in a third row, and so forth. Incidentally, the first electrode selecting section 300 is adapted not to select a plurality of first electrodes 20 at the same time.

(Second Voltage Switching Section)

For example, as shown in FIG. 1, the display apparatus 1000 includes the plurality of second voltage switching sections 400 (for example, the same number as that of the second electrodes 40 included in the electrochromic display device 100).

Each of the second voltage switching sections 400 switches, for example, a voltage applied to the second electrode 40 connected to the second voltage switching section 400 between a positive voltage and a negative voltage.

To put it concretely, for example, as shown in FIG. 6, each of the second voltage switching sections 400 includes a second positive voltage power source 401 outputting a positive voltage (for example, +VL=+3 V to +10 V), a second P channel transistor 402 functioning as a switch, a second negative voltage power source 403 outputting a negative voltage (for example, −VL=−1 V to 0 V), a second N channel transistor 404 functioning as a switch, and the like.

The second positive voltage power source 401 is adapted to be turned on and off by, for example, the second electrode selecting section 500. When the second positive voltage power source 401 is turned on, the positive voltage is applied to one end (source) of the second P channel transistor 402.

The second P channel transistor 402 includes, for example, a gate connected to a gate terminal 400a, the one end (source) connected to the second positive voltage power source 401, and the other end (drain) connected to an output terminal 400b connected to the corresponding second electrode 40 of the electrochromic display device 100.

The second negative voltage power source 403 is adapted to be turned on and off by, for example, the second electrode selecting section 500. When the second negative voltage power source 403 is turned on, the negative voltage is applied to one end (source) of the second N channel transistor 404.

The second N channel transistor 404 includes, for example, a gate connected to the gate terminal 400a, the one end (source) connected to the second negative voltage power source 403, and the other end (drain) connected to the output terminal 400b connected to the corresponding second electrode 40 of the electrochromic display device 100.

(Second Electrode Selecting Section)

The second electrode selecting section 500 applies positive voltages and negative voltages to the second electrodes 40 (data electrodes) by controlling the second voltage switching sections 400 in conformity with, for example, control signals input from the control section 600.

To put it concretely, the second electrode selecting section 500, for example, applies a predetermined positive voltage to the gate terminal 400a of one of the second voltage switching sections 400, and turns on the second positive voltage power source 401 of the second voltage switching section 400. Thereby, the predetermined positive voltage is applied to the gate of the second P channel transistor 402 of the second voltage switching section 400, and the positive voltage from the second positive voltage power source 401 is applied to the one end (source) of the second P channel transistor 402. Consequently, the second P channel transistor 402 is turned on, and the positive voltage is applied to the corresponding second electrode 40 through the output terminal 400b of the second voltage switching section 400.

On the other hand, the second electrode selecting section 500, for example, applies a predetermined negative voltage to the gate terminal 400*a* of the second voltage switching section 400, and turns on the second negative voltage power source 403 thereof. Thereby, the predetermined negative voltage is applied to the gate of the second N channel transistor 404 of the second voltage switching section 400, and the negative voltage from the second negative voltage power source 403 is applied to the one end (source) of the second N channel transistor 404. Consequently, the second N channel transistor 404 is turned on, and the negative voltage is applied to the corresponding second electrode 40 through the output terminal 400*b*.

In the following, "applying the positive voltage (first positive voltage) to the second electrode 40" will be sometimes expressed as "selecting the second electrode 40," and "applying the negative voltage (second negative voltage) to the second electrode 40" will be sometimes expressed as "not selecting the second electrode 40."

To put it more concretely, the second electrode selecting section 500 selects the second electrodes 40 in synchronization with the selection of the first electrodes 20 by the first electrode selecting section 300. That is, for example, when the first electrode 20 in the first row is selected by the first electrode selecting section 300, the second electrode selecting section 500 selects one of the second electrodes 40 constituting a pixel to be colored in the first row, and makes the second electrodes 40 constituting the pixels not to be colored in the first row non-selection. For example, when the first electrode 20 in the second row is selected by the first electrode selecting section 300, the second electrode selecting section 500 selects one of the second electrodes 40 constituting a pixel to be colored in the second row, and makes the second electrodes 40 constituting the pixels not to be colored in the second row non-selection.

(Control Section)

The control section 600 includes, for example, a central processing unit (CPU), a read only memory (ROM), a random access memory (RAM), and the like, and controls the operation of each section constituting the display apparatus 1000 in a concentrated manner.

(Display Operation)

The control section 600 controls the first electrode selecting section 300 and the second electrode selecting section 500 on the basis of image data input from, for example, the outside, to make the electrochromic display device 100 display the image based on the image data by a passive matrix drive through the first voltage switching sections 200 and the second voltage switching sections 400.

To put it concretely, the control section 600 selects a pixel to be colored, and applies the voltage of the first potential difference between the first electrode 20, used as a negative electrode, and the second electrode 40, used as a positive electrode, both constituting the selected pixel (selection pixel), to display the selection pixel. The control section 600 further applies the voltage of the second potential difference, which is smaller than the first potential difference not to cause any energizations between the first electrodes 20, used as positive electrodes, other than the first electrode 20 constituting the selection pixel, and the second electrodes 40, used as negative electrodes, other than the second electrode 40 constituting the selection pixel, to keep the states of the pixels (non-selection pixels) other than the selection pixel, and thereby the control section 600 makes the electrochromic display device 100 display an image.

Here, "displaying a pixel" indicates "coloring a pixel." Moreover, "keeping the state of a pixel" indicates not to change the sate of a pixel. For example, when the pixel is not colored, then the "keeping the state of the pixel" means to keep the uncolored state of the pixel, and, for example, when the pixel is colored, then the "keeping the state of the pixel" means to keep the colored state of the pixel.

Moreover, the first potential difference means the voltage between the electrodes 20 and 40 by which a current flows through the electrodes 20 and 40. Because the first potential difference depends on the qualities of the materials and the like of the first electrodes 20 and the second electrodes 40, it is hard to express the first potential difference unconditionally, but, for example, the first potential difference is 3-6 V. Moreover, the second potential difference means the voltage between the electrodes 20 and 40 by which no currents flow through the electrodes 20 and 40, and also the second potential difference depends on the qualities of the materials and the like of the first electrodes 20 and the second electrodes 40.

Figure 7:
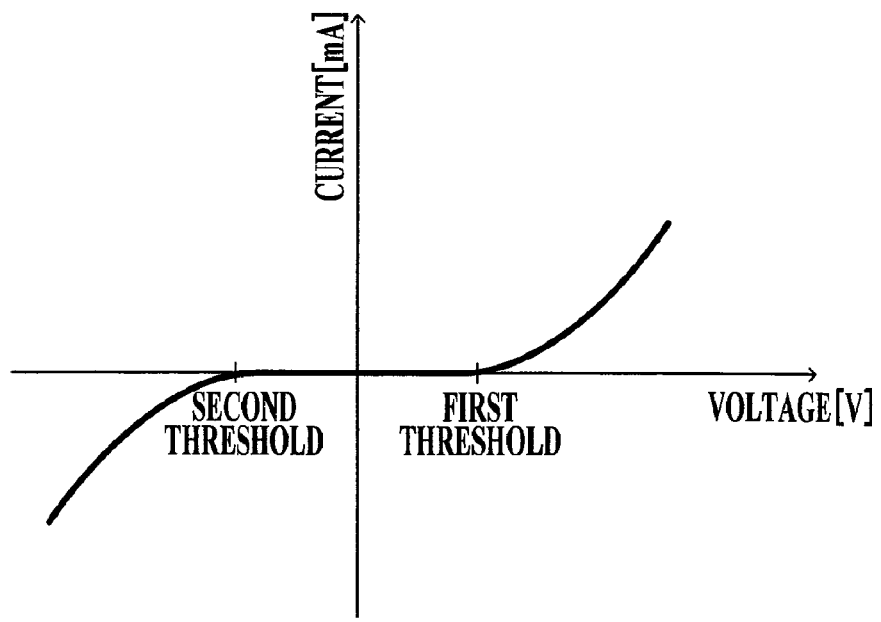
FIG. 7 is a diagram for illustrating a current-voltage characteristic between electrodes oxidized in at least their surfaces.

Because the first electrodes 20 and the second electrodes 40 are oxidized at least in their surfaces, each of the current-voltage characteristics between the first and second electrodes 20 and 40 becomes nonlinear, for example, as shown in FIG. 7. That is, each of the first electrodes 20 and the second electrodes 40 has the following characteristic: when a voltage larger than a first threshold value is applied between the electrodes 20 and 40 or a voltage smaller than a second threshold value is applied between the electrodes 20 and 40, a current flows between the electrodes 20 and 40; but when a voltage equal to or less than the first threshold value and equal to or larger than the second threshold value is applied between the electrodes 20 and 40, no currents flow between the electrodes 20 and 40.

Consequently, when the first potential difference is set to the voltage making a current flow between the electrodes 20 and 40 and the second potential difference is set to the voltage making no currents flow between the electrodes 20 and 40, then energizations are suppressed even when potential differences are generated between the electrodes 20 and 40 constituting the non-selection pixels around a selection pixel owing to an influence from the selection pixel. Consequently, the non-selection pixels are not colored, and only the selection pixel is colored. Thus, it is possible to display a high resolution image.

However, when the electrochromic display device 100 is driven at a high speed, then the nonlinearity of the current-voltage characteristics between the electrodes 20 and 40 is broken, and the non-selection pixels also become colored owing to leakage currents.

Accordingly, the present invention applies voltages between the first electrodes 20, used as positive electrodes, other than the first electrode 20 constituting a selection pixel, and the second electrodes 40, used as negative electrodes, other than the second electrode 40 constituting the selection pixel, in the directions reverse to that of the voltage applied between the electrodes 20 and 40 constituting the selection pixel, and thereby prevents the sneaking of currents to suppress the coloring owing to leakage currents.

Furthermore, the present invention sets the voltage of the second potential difference to the voltage smaller than the first potential difference (more specifically, sets the voltage between the electrodes 20 and 40 to the one making no currents flow between the electrodes 20 and 40), to prevent the coloring of the electrochromic compositions 52 on the surfaces of the first electrodes 20. Thus the present invention makes the electrochromic compositions 52 be colored only on the surfaces of the second electrodes 40, and suppresses the power consumption of the display apparatus 1000.

However, when the positive voltage is applied to the second electrode 40 constituting the selection pixel in order to use the second electrode 40 as the positive electrode, and when the negative voltages are applied to the second electrodes 40 other than the second electrode 40 constituting the selection pixel in order to use the second electrodes 40 as the negative electrodes, then potential differences are generated between the second electrodes 40 to leak currents.

Accordingly, the present invention provides the insulative partition walls 51 between the second electrodes 40 to make the resistance between the second electrodes 40, and thereby intercepts the leakage of currents and then prevents the sneaking of the currents. Thereby, the present invention suppresses the coloring owing to the leakage currents.

An example of the display operation of making the electrochromic display device 100 display an image will be described more concretely with reference to FIGS. 8 and 9.

Figure 8:
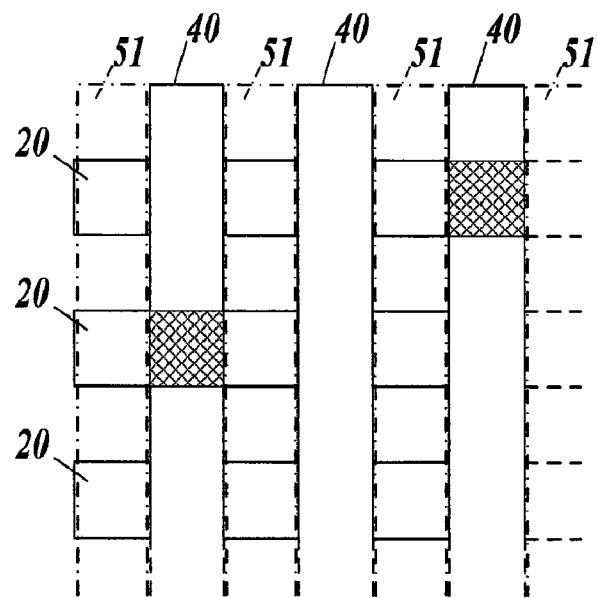
FIG. 8 is a diagram for illustrating an example of a display operation to make the electrochromic display device of the present embodiment display an image.
Figure 9:
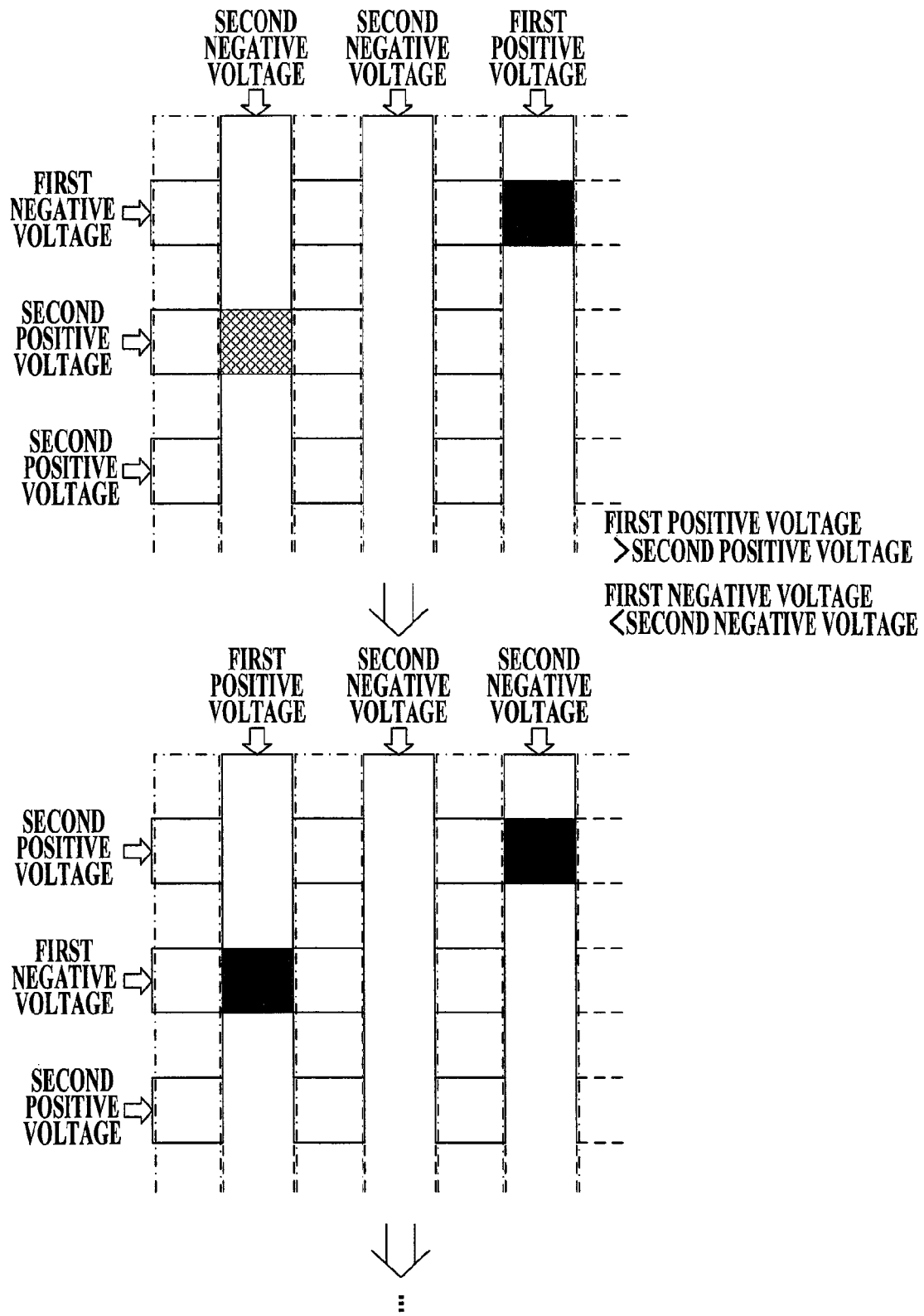
FIG. 9 is a diagram for illustrating an example of the display operation to make the electrochromic display device of the present embodiment display the image.

In FIGS. 8 and 9, selection pixels are subjected to half-tone dot meshing, and the insulative partition walls 51 are shown by imaginary lines (alternate long and short dash lines).

For example, as shown in FIG. 9, first, the control section 600 applies the first negative voltage (for example, −3 V) to the line of the first row (the first electrode 20 in the first row), and applies the first positive voltage (for example, +3 V) to the second electrode 40 constituting a selection pixel among the pixels in the line of the first row. Thereby the control section 600 applies the voltage of the first potential difference between these electrodes 20 and 40. At the same time, the control section 600 applies the second positive voltages (for example, +0.1 V) each smaller than the first positive voltage to the first electrodes 20 other than the first electrode 20 in the first row, and applies the second negative voltages (for example, −0.1 V) each larger than the first negative voltage to the second electrodes 40 constituting non-selection pixels among the pixels in the line of the first row. Thereby the control section 600 applies the voltages of the second potential differences between the electrodes 20 and 40.

In the pixel to which the voltage of the first potential difference is applied, a current flows from the second electrode 40 to the first electrode 20 through the electrochromic composition 52, and the electrochromic composition 52 causes an electrochemical change at the interface (on the surface of the second electrode 40) between the electrochromic composition layer 50 and the second electrode 40. Consequently, the selection pixel in the line of the first row is colored.

On the other hand, in the pixels to which the voltages other than that of the first potential difference are applied, no currents flow between the first electrodes 20 and the second electrodes 40, and no changes are caused in the electrochromic compositions 52. Consequently, all the pixels other than the selection pixel in the line of the first row do not change in their states.

Next, the control section 600 applies the first negative voltage (for example, −3 V) to the line of the second row (the first electrode 20 in the second row), and applies the first positive voltage (for example, +3 V) to the second electrode 40 constituting a selection pixel among the pixels in the line of the second row to apply the voltage of the first potential difference between these electrodes 20 and 40. Thereby, the control section 600 displays the selection pixel in the line of the second row. At the same time, the control section 600 applies the second positive voltages (for example, +0.1 V) to the first electrodes 20 other than the first electrode 20 in the second row, and applies the second negative voltages (for example, −0.1 V) to the second electrodes 40 constituting the non-selection pixels among the pixels in the line of the second row. Thereby the control section 600 applies the voltages of the second potential differences between these electrodes 20 and 40 to make all the pixels other than the section pixel in the line of the second row non-displays.

Then, the control section 600 performs the processing similar to that mentioned above to the third row, the fourth row, the fifth row, and so forth to make the electrochromic display device 100 display an image for 1 frame (1 page).

Incidentally, when the electrochromic display device 100 is used as, for example, electronic paper, then it is necessary to keep a display.

Accordingly, the control section 600 is adapted to keep the image displayed in the electrochromic display device 100 by supplying currents smaller than those supplied for displaying the image to the electrochromic display device 100.

To put it concretely, the control section 600 keeps the display of a selection pixel by applying a voltage of a potential difference (specifically a potential difference of a half of the first potential difference or less) smaller than the first potential difference between the first electrode 20, used as a negative electrode, and the second electrode 40, used as a positive electrode, both constituting the selection pixel, and the control section 600 keeps the non-displays of the pixels (non-selection pixels) other than the selection pixel by applying the voltages of the second potential differences between the first electrodes 20, used as positive electrodes, other than the first electrode 20 constituting the selection pixel, and the second electrodes 40, used as negative electrodes, other than the second electrode 40 constituting the selection pixel. Thereby the control section 600 keeps the image displayed in the electrochromic display device 100.

(Erasion Operation)

Moreover, the control section 600 controls, for example, the first electrode selecting section 300 and the second electrode selecting section 500 to perform energizations in the directions reverse to those of the energizations for a display (coloring) through the first voltage switching sections 200 and the second voltage switching sections 400, that is, to make currents flow from the first electrodes 20 to the second electrodes 40. Thereby, the control section 600 erases the image displayed in the electrochromic display device 100.

To put it concretely, the control section 600 erases the coloring of a selection pixel by applying a voltage of a predetermined potential difference (specifically a voltage between electrodes capable of making a current flow between the electrodes) between the first electrode 20, used as a positive electrode, and the second electrode 40, used as a negative electrode, both constituting the selection pixel. Furthermore, the control section 600 keeps the non-displays of the pixels (non-selection pixels) other than the selection pixel by applying the voltages of predetermined potential differences (specifically the voltages between electrodes making no currents flow between the electrodes) between the first electrodes 20, used as negative electrodes (or may be positive electrodes), other than the first electrode 20 constituting the selection pixel, and the second electrodes 40, used as positive electrodes (or may be negative electrodes), other than the second electrode 40 constituting the selection pixel. The controls section 600 thereby erases the image displayed in the electrochromic display device 100.

Incidentally, the erasion of the image displayed in the electrochromic display device 100 is performed by the energizations in the directions reverse to those of the energizations for a display, or is performed by intercepting the energizations for the display and leaving the display apparatus 100 as it is, but the energizations in the directions reverse to those of the energizations for the display can execute the erasion operation more rapidly.

Here, it is necessary for a conventional display device using the electrochromic compositions 52 to which the adsorbents 53 (aluminum oxides and/or aluminum hydroxides) are not added to strictly control the energizing quantities of the energizations for erasion. This is because the leuco dyes move to the interfaces (the surfaces of the first electrodes 20) between the electrochromic composition layer 50 and the first electrodes 20 by the energizations for the erasion to be colored, and, as the result, a display is not erased sometimes.

On the contrary, in the electrochromic display device 100 of the present embodiment, even when the energizing quantities of the energizations for erasion are not strictly controlled unlike the conventional display device, the leuco dyes are adsorbed by the adsorbents 53 at the time of energizations for erasion, and consequently it can be prevented that the leuco dyes move to the interfaces (the surfaces of the first electrodes 20) between the electrochromic composition layer 50 and the first electrodes 20 and are colored.

To put it concretely, the leuco dyes are polarized in solutions. The adsorbents 53 (aluminum oxides and/or aluminum hydroxides) have the features that their specific surface areas are large and their adsorption abilities are high, and their surfaces are polarized. Because the second electrodes 40 are positive electrodes in the energizations of a color display, the leuco dyes, which are electron donatives, give electrons to the second electrodes 40 to be colored. Thus a display is performed. On the other hand, because the energizations are performed in the directions reverse to those of the energizations for the display in the energizations for erasion, the second electrodes 40 are used as the negative electrodes. The leuco dyes receive electrons from the second electrodes 40 of the negative electrodes to be erased, and thus the colors are erased. Then, the leuco dyes changed to be colorless move into the directions of the first electrodes 20, but the leuco dyes do not reach the first electrodes 20 owing to the existence of the adsorbents 53 having high adsorption abilities and polarized surfaces, and the leuco dyes move to the adsorbents 53 to be trapped and adsorbed. Thereby, the electrochromic display device 100 of the present embodiment can prevent the leuco dyes from moving to the interfaces (the surfaces of the first electrodes 20) between the electrochromic composition layer 50 and the first electrodes 20 to be colored at the time of the energizations for erasion.

EXAMPLE 1

In the following, the present invention will be further described in detail by means of a concrete example, but the present invention is not limited to the example.
(Making of Electrochromic Display Device)

A rectangular non-alkali glass substrate having a thickness of 0.7 mm was used as the second substrate 30, and an ITO was formed on one surface (the under surface) of the second substrate 30 by sputtering. The sputtered ITO had a film thickness of 200 nm and a surface resistance of 10Ω/□. The ITO formed by the sputtering was patterned into stripes each having a width of 0.42 mm and a pitch of 0.45 mm by the use of the photolithographic method. Thus the second electrodes 40 were made.

Similarly, a rectangular non-alkali glass substrate was used as the first substrate 10, and chromium was formed on one surface (the upper surface) of the first substrate 10 by sputtering. An oxide film (chromium oxide) was formed on the surface of the sputtered chromium. The sputtered chromium (including the chromium oxide on the surface thereof) had a film thickness of 200 nm and a surface resistance of 1Ω/□. The chromium (including the chromium oxide on the surface thereof) formed by the sputtering was patterned into 128 lines of stripes each having a width of 0.42 mm and a pitch of 0.45 mm by the use of the photolithographic method. Thus the first electrodes 20 were made.

Next, a heat curable epoxy resin (TB2235 in ThreeBond 2200 series available from ThreeBond Co., Ltd.) was patterned into stripes each having a width of 50 μm in parallel with the second electrodes 40 in stripes so as to fill the spaces between the formed second electrodes 40, by the use of the screen printing method. Furthermore, similar patterns were printed on the printed heat curable epoxy resins so as to be superposed on the printed heat curable epoxy resins by five times.

Next, the first substrate 10, on which the first electrodes 20 were formed, was superposed on the second substrate 30, on which the second electrodes 40 were formed and the heat curable epoxy resins were printed, so that the first electrodes 20 might be perpendicular to the second electrodes 40, before the printed heat curable epoxy resins were cured. Then, the parts where the first electrodes 20 and the second electrodes 40 cross each other at right angles were adjusted to be the pixels 60, and the first and second substrates 10 and 30 were heated for two hours in an oven at 200° C. to cure the heat curable epoxy resins. Thus the insulative partition walls 51 were made, and the first electrodes 20 and the second electrodes 40 were closely contacted with each other with the insulative partition walls 51 put between them. The measurements of the thicknesses of the insulative partition walls 51 severally resulted in about 50 μm.

Next, the electrochromic compositions 52 (hereinafter referred to as "electrochromic compositions A"), to which predetermined additives (display quality deterioration inhibitors, adsorbents 53, polymer compounds, or the like) were added, were poured into the spaces between the insulative partition walls 51, and the electrochromic compositions A were filled up. Then, the spouts of the electrochromic compositions A (the inlets of the electrochromic compositions A) and the sides opposed to the spouts (the outlets of the electrochromic compositions A) were sealed with adhesives, and thus the electrochromic display device 100 (hereinafter referred to as "display device A") was made.

The composition of each of the electrochromic compositions A was as follows:

100 mg of supporting electrolyte (tetra-n-butylammonium tetrafluoroborate (($n$-$C_4H_9$)$_4$$NBF_4$)), 1.0 g of polar solvent (N,N-diethylacetamide), 300 mg of leuco dye (aforesaid formula (16)), 56 mg of hydroquinone derivative (aforesaid formula (19)), 15 mg of ferrocene derivative (aforesaid formula (35)), 106 mg of a compound having a carbonyl group (dibenzoyl derivative) (aforesaid formula (57)), 75 mg of adsorbent 53 (aluminum oxide; activated alumina C200 available from Nippon Light Metal Co., Ltd.), and 25 mg of polymer compound (polyvinyl butyral; S-LEC BH3 available from Sekisui Chemical Co., Ltd.).
(Display Operation)

The first voltage switching sections 200 and the second voltage switching sections 400 were connected to 60 lines of the line electrodes (first electrodes 20) and 60 lines of data electrodes (second electrodes 40) of the display device A, respectively, and a display apparatus 1 having the display device A was made as the electrochromic display device 100.

Next, the energizations for display were performed by the use of a passive matrix driving method. To put it concretely, the following voltages were applied to the display apparatus 1 at the speeds of 1 millisecond per line on the settings of +VH=+3 V, −VH=−3 V, +VL=+0.1 V, and −VL=−0.1 V, and a display pattern (a pattern of checks) was formed in 0.06 seconds.

(Holding Operation)

Next, the following voltages are applied to the display apparatus 1 at a speed of 1 millisecond per line on the settings of +VH=+1.5 V, −VH=−1.5 V, +VL=+0.1 V, and −VL=−0.1 V, and the display pattern was held for 10 seconds.

(Erasion Operation)

Next, energizations (the energizations for erasion) were performed into the directions reverse to those of the energizations for the display. To put it concretely, the following voltages to the display apparatus 1 were applied at a speed of 1 millisecond per line on the settings of +VH=+4.5 V, −VH=−4.5 V, +VL=+0.1 V, and −VL=−0.1 V, and the energizations were performed for 0.5 seconds.

(The Results of the Example 1)

Figure 10:
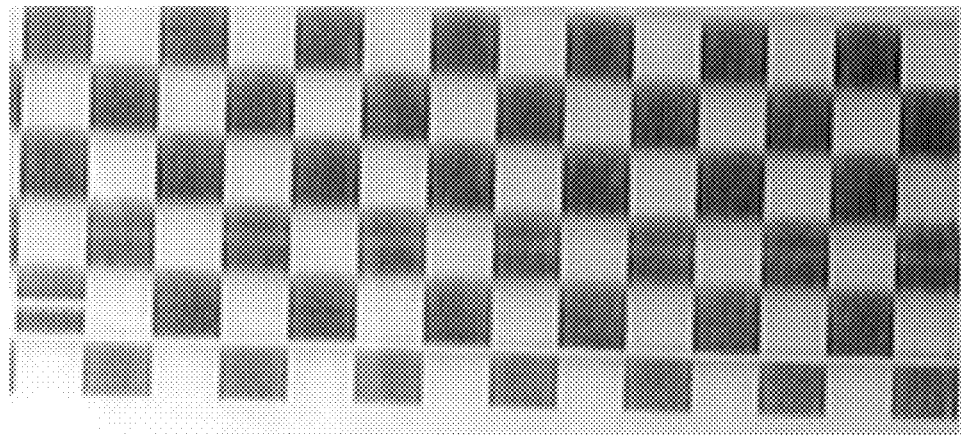
FIG. 10 is a view showing a result of an example 1.

In the example 1, for example, as shown in FIG. 10, a pattern of checks having high resolution could be displayed at a high speed by the display operation mentioned above.

Moreover, the displayed pattern having the high resolution could be held by the holding operation mentioned above.

Moreover, the displayed pattern of the checks could be surely erased by the erasion operation mentioned above.

(The Results of Comparative Examples 1 and 2)

A display apparatus different from the example 1 only in not being equipped with the insulative partition walls 51, and in applying a voltage between the first electrode 20 and the second electrode 40, both constituting a selection pixel, and applying no voltages between the first electrodes 20 other than the first electrode 20 constituting the selection pixel and the second electrodes 40 other than the second electrode 40 constituting the selection pixel, was made as a comparative example 1. A display apparatus different from the example 1 only in not being equipped with the insulative partition walls 51 was made as a comparative example 2. Then the display operations of the comparative examples 1 and 2 were performed.

Figure 11:
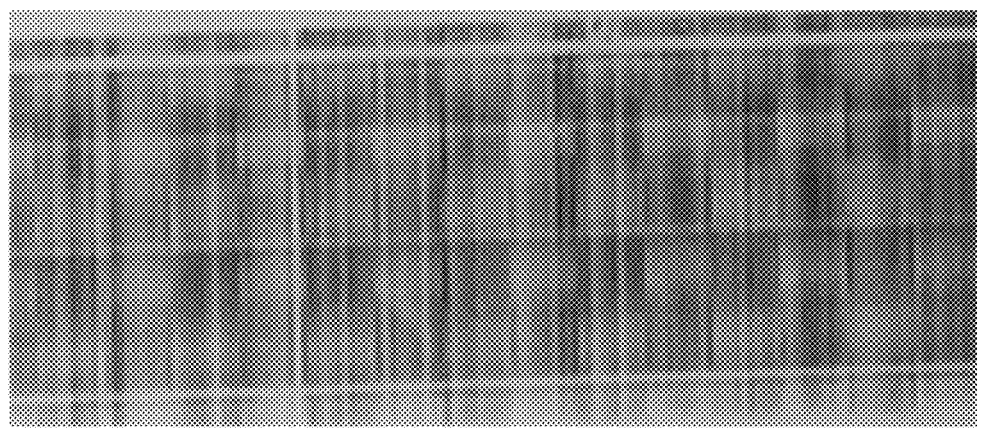
FIG. 11 is a view showing a result of a comparative example 1.

In the comparative example 1, for example, as shown in FIG. 11, the resolution of the displayed pattern of checks was low, and almost no checks could be recognized.

Moreover, in the comparative example 2, ghosts were generated in the data direction, that is, along the second electrodes 40.

From the results mentioned above, it was found that a high resolution display could be obtained even when voltages were applied at the speed of 1 millisecond per line by taking the following three measures to meet the situation: (1) oxidizing the first electrodes 20 and the second electrodes 40 in at least their surfaces, (2) being equipped with the insulative partition walls 51, and (3) applying the voltage of the first potential difference between the first electrode 20, used as a negative electrode, and the second electrode 40, used as a positive electrode, both constituting a selection pixel, and applying the voltages of the second potential differences smaller than the first potential difference between the first electrodes 20, used as positive electrodes, other than the first electrode 20 constituting the selection pixel, and the second electrodes 40, used as negative electrodes, other than the second electrode 40 constituting the selection pixel. That is, it was found that a high speed and high resolution display could be realized by taking those three measures to meet the situation.

According to the electrochromic display device 100 of the present embodiment described above, the electrochromic display device 100 is a passive matrix drive display device element that includes the first substrate 10, the first electrodes 20 provided on the upper surface of the first substrate 10, the second substrate 30, which is provided to be opposed to the first substrate 10 above the first substrate 10 and is formed of a transparent material, the second electrodes 40, which are provided on the under surface of the second substrate 30 and at least a part of which is formed of a transparent electrode material, and the electrochromic composition layer 50 provided between the first substrate 10 and the second substrate 30, wherein the display device element executes a display by the energizations between the first electrodes 20 and the second electrodes 40, and executes the erasion of the display by the energizations between the first electrodes 20 and the second electrodes 40 into the directions reverse to those of the energizations for the display. Then, the first electrodes 20 are a plurality of electrodes extending in parallel with each other. The second electrodes 40 are transparent display electrodes composed of a plurality of transparent electrodes extending into the directions perpendicular to those of the first electrodes 20 in parallel with each other. The pixels 60 are formed in the regions in which the first electrodes 20 and the second electrodes 40 are grade separated crossing with each other. The first electrodes 20 and the second electrodes 40 are oxidized in at least their surfaces. The electrochromic composition layer 50 includes a plurality of insulative partition walls 51, which are arranged between the second electrodes 40 adjoining each other and extend in parallel with each other into the directions perpendicular to those of the first electrodes 20, and the electrochromic compositions 52, which are introduced between the insulative partition walls 51 adjoining each other and contain supporting electrolytes, polar solvents, and leuco dyes. The electrochromic display device 100 is adapted to display a selection pixel by applying the voltage of the first potential difference between the first electrode 20, used as a negative electrode, and the second electrode 40, used as a positive electrode, both constituting the selection pixel, and to apply the voltages of the second potential differences, which are smaller than the first potential difference and cause no energizations between the electrodes, between the first electrodes 20, used as positive electrodes, other than the first electrode 20 constituting the selection pixel, and the second electrodes 40, used as negative electrodes, other than the second electrode 40 constituting the selection pixel.

That is, because the first electrodes 20 and the second electrodes 40 are oxidized in at least their surfaces, the current-voltage characteristics between the first and second electrodes become nonlinear. Consequently, even when potential differences owing to the influences of a selection pixel are produced between the electrodes constituting the non-selection pixels around the selection pixel, energizations are suppressed, and consequently the non-selection pixels are not colored to make it possible to color only the selection pixel.

However, when the electrochromic display device 100 is driven at a high speed, the nonlinearity of the current-voltage characteristics between electrodes is sometimes broken, and also the non-selection pixels are sometimes colored. Accordingly, the first electrodes 20 other than the first electrode 20 constituting the selection pixel are used as positive electrodes, and the second electrodes 40 other than the second electrode 40 constituting the selection pixel are used as negative electrodes. Thereby, voltages are applied between the first and second electrodes 20 and 40 into the directions reverse to that of the voltage applied between the first and second electrodes 20 and 40 constituting the selection pixel to suppress the sneaking of currents. Thereby, the coloring caused by leakage currents is prevented. Furthermore, by making the voltages of the second potential differences to be the voltages of the potential differences smaller than the first potential difference, the coloring of the electrochromic compositions 52 on the surfaces of the first electrodes 20 is prevented, and the coloring only on the surfaces of the second electrodes 40 is performed. Thus, the power consumption of the electrochromic display apparatus 100 is suppressed.

However, in the case where the second electrode 40 constituting a selection pixel is used as a positive electrode and the second electrodes 40 other than the second electrode 40 constituting the selection pixel are used as negative electrodes, potential differences are generated between these second electrodes 40, and currents leak. Accordingly, by arranging the insulative partition walls 51 between the second electrodes 40 adjoining each other, the leakage of currents is intercepted, and the coloring cause by the leakage currents is suppressed.

Consequently, even when the electrochromic display device 100 is driven at a high speed, a high resolution image can be displayed, and a high speed and high quality display can be realized.

Moreover, according to the electrochromic display device 100 of the present embodiment described above, display quality deterioration suppressing compounds (compounds having hydroquinone derivatives and/or catechol derivatives, ferrocene derivatives, and carbonyl groups) are added to the electrochromic compositions 52.

That is, because the display quality deterioration suppressing compounds are added to the electrochromic compositions 52, the deterioration of the display quality of the electrochromic display device 100 caused by the repetition operations of coloring and erasing of leuco dyes can be suppressed.

Moreover, according to the electrochromic display device 100 of the present embodiment described above, the adsorbents 53 (aluminum oxides and/or aluminum hydroxides) for adsorbing the leuco dyes at the time of energizations for erasure are added to the electrochromic compositions 52.

That is, because the leuco dyes are adsorbed by the adsorbents 53 at the time of the energizations for erasure, it can be prevented that the leuco dyes move to the electrodes (first electrodes 20) on the opposite side of the display electrodes (second electrodes 40) to form colored displays. Consequently, even when energizing quantities are not strictly controlled, it is possible to surely erase displays at the time of the erasure of the displays by the energizations into the directions reverse to those of the energizations for displays.

Incidentally, the present invention is not limited to the embodiment described above, but can be suitably changed without departing from the scope of the invention.
(Modification 1)

Figure 12:
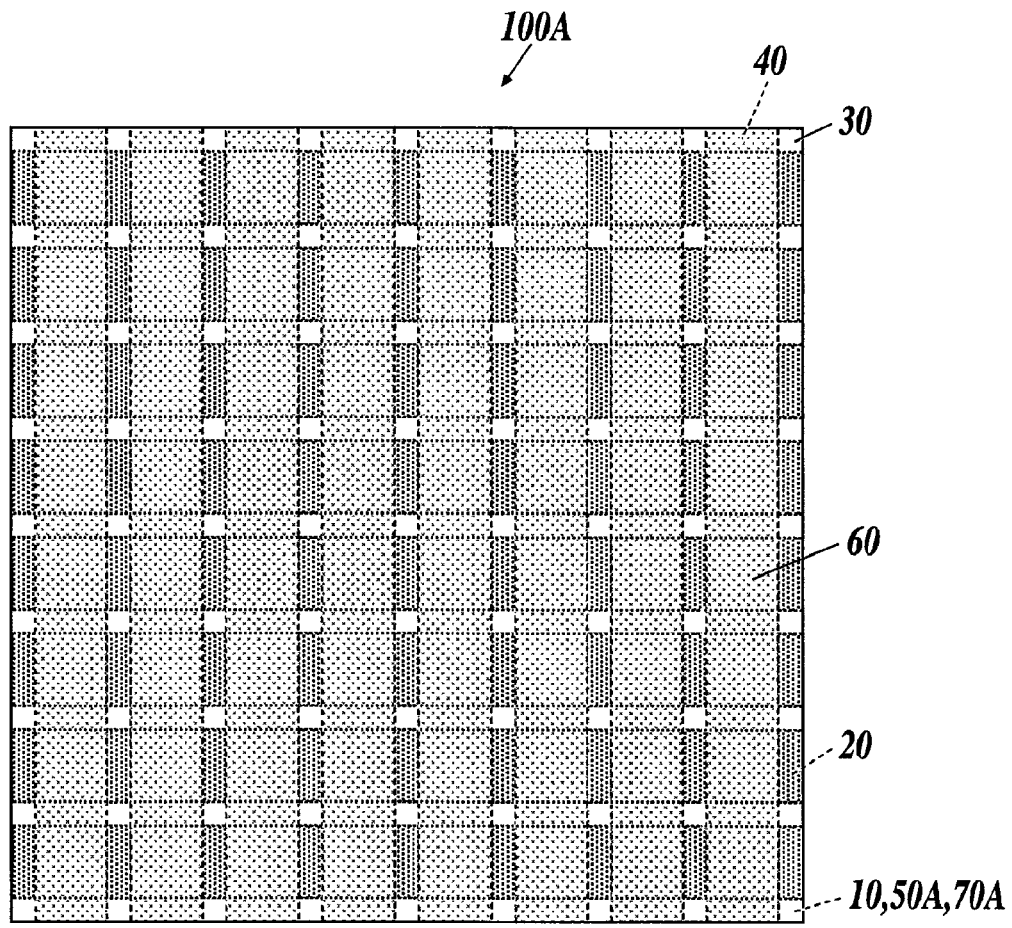
FIG. 12 is a plan view schematically showing an example of the electrochromic display device of a modification 1.
Figure 13:
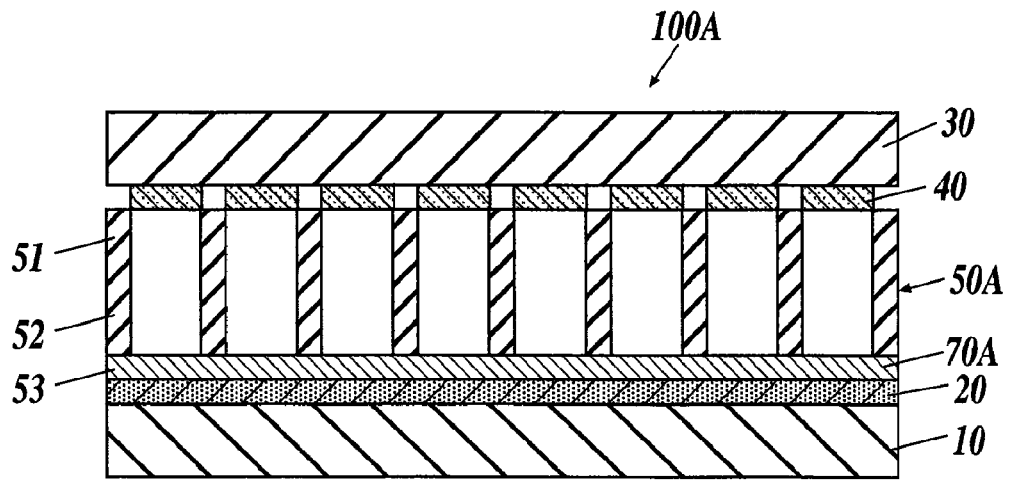
FIG. 13 is a sectional view schematically showing the example of the electrochromic display device of the modification 1.

The electrochromic display device 100 of the embodiment described above may be provided with adsorption layers 70A containing the adsorbents 53 between the first electrodes 20 and an electrochromic composition layer 50A in place of adding (dispersing) the adsorbents 53 in the electrochromic compositions 52 constituting the electrochromic composition layer 50 as an electrochromic display device 100A shown in, for example, FIGS. 12 and 13.

The electrochromic composition layer 50A provided in the electrochromic display device 100A of the modification 1 includes the electrochromic compositions 52 to which display quality deterioration inhibitors, polymer compounds, and the like are added, but to which no adsorbents 53 are added.

Moreover, the electrochromic display device 100A of the modification 1 is provided with the adsorption layers 70A deposited on the first electrodes 20 to contact with the electrochromic composition layer 50A.

The adsorption layers 70A have, for example, the functions of adsorbing the leuco dyes at the time of the energizations for the erasure between the first electrodes 20 and the second electrodes 40.

The adsorption layers 70A are composed of, for example, the adsorbents 53 (aluminum oxides and/or aluminum hydroxides), water soluble binders, and the like.

To put it concretely, the adsorption layers 70A are made by, for example, making a dispersion liquid by dispersing the adsorbent 53 and a water soluble binder uniformly in a medium, such as water, and by applying the dispersion liquid on the first electrodes 20 and drying the applied dispersion liquid.

The adsorbents 53 (aluminum oxides and/or aluminum hydroxides) are not especially limited, but the following compounds can be preferably used for each of the adsorbents 53 from the point of view of an absorption effect and the like: an aluminum oxide having a large surface area, such as gamma alumina; an aluminum oxide having a particle diameter of 1 μm or less; an aluminum hydroxide having a large surface area; and an aluminum hydroxide having a particle diameter of 1 μm or less.

Moreover, the water soluble binder used as a binder is not especially limited, but, for example, the followings can be used as the water soluble binder: starch; gelatin; cellulose derivatives, such as carboxymethyl cellulose (CMC) and methylcellulose (MC); polyvinyl alcohol (PVA); a polyacrylic series polymer; polyacrylamide (PAM); and a polyethylene oxide (PEO). Among them, polyvinyl alcohol can be preferably used.

The addition quantity of the water soluble binder is not especially limited, but it is preferable to be 0.1-30 weight % of each of the adsorbents 53, and is more preferable to be 1-10 weight %. When the addition quantity of the water soluble binder is too small, then the applied and formed adsorption layer 70A is easily physically damaged to be easily peeled off by contact or the like. On the other hand, when the addition quantity of the water soluble binder is too large, then the absorption effect of each of the adsorbents 53 (aluminum oxides and/or aluminum hydroxides) is blocked. Moreover, when the addition quantity of the water soluble binder is too large, then it causes to heighten the electric resistance thereof, and it exerts disadvantageous influences, such as the lowering of the energizing quantities between electrodes, on the coloring display operations and erasure operations of the electrochromic display device 100A.

The aluminum oxide and/or the aluminum hydroxide can be easily obtained as chemical products.

The examples of the suitable commercially available aluminum oxides and aluminum hydroxides will be shown in the following, but those are illustrations, and do not limit the scopes of the aluminum oxides and the aluminum hydroxides.

As concrete examples of the commercially available adsorbents 53, for example, the followings can be given: aluminum oxide 60G Neutral (particle diameter: 4-50 μm) for thin-layer chromatography available from Merk & Co., Inc.; low soda alumina LS235 (particle diameter: 0.47 μm), activated alumina C200 (particle diameter: 4.4 μm), and aluminum hydroxide B1403 (particle diameter: 1.5 μm), all available from Nippon Light Metal Co., Ltd.; and gamma alumina KC501 (particle diameter: 1 μm) available from Sumitomo Chemical Co., Ltd.

According to the electrochromic display device 100A of the modification 1 described above, the electrochromic display device 100A is provided with the adsorption layers 70A containing the adsorbents 53 (aluminum oxides and/or aluminum hydroxides) adsorbing the leuco dyes at the time of the energizations for erasion between the first electrodes 20 and the electrochromic composition layer 50A.

That is, because the leuco dyes are adsorbed by the adsorption layers 70A containing the adsorbents 53 at the time of the energizations for erasion, it can be prevented that the leuco dyes move to the electrodes (first electrodes 20) on the opposite side to the display electrodes (second electrodes 40) to form coloring displays. Consequently, it is possible to surely erase displays at the time of erasing the displays by performing the energizations in the direction reverse to those of the energizations for the displays even when the energizing quantities are not strictly controlled.

Although both of the numbers of the first electrodes 20 and the second electrodes 40 are severally shown as 8 in FIGS. 1-4, and FIGS. 12 and 13, each of the numbers of the first electrodes 20 and the second electrodes 40 is not limited to 8, and the numbers are arbitrary as long as the numbers are plural.

The circuit configurations of each of the first voltage switching sections 200 and each of the second voltage switching sections 400 in the embodiment and the modification 1, described above, are not limited to those shown in FIGS. 5 and 6, respectively, but the circuit configurations of the first and second voltage switching sections 200 and 400 are arbitrary as long as each of the circuit configurations can display a selection pixel by applying the voltage of the first potential difference between the first electrode 20, used as a negative electrode, and the second electrode 40, used as a positive electrode, both constituting the selection pixel, and can make non-selection pixels non-displays by applying the voltage of the second potential difference smaller than the first electric potential between the first electrodes 20, used as positive electrodes, other than the first electrode 20 constituting the selection pixel and the second electrodes 40, used as negative electrodes, other than the second electrode 40 constituting the selection pixel at the time of a display operation.

According to an aspect of the preferred embodiments of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed with a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, wherein at least a surface of the first electrode and of the second electrode is respectively oxidized, wherein the electrochromic composition layer comprises (i) a plurality of insulative partition walls which extend parallely in the direction perpendicular to the extending direction of the first electrode in a state of being arranged between the second electrode adjoining each other, and (ii) an electrochromic composition introduced between the insulative partition walls adjoining each other, the electrochromic composition including a supporting electrolyte, a polar solvent, and a leuco dye, and wherein the electrochromic display device displays a selected pixel by applying a voltage of a first potential difference between the first electrode used as a negative electrode and the second electrode used as a positive electrode, the first electrode and the second electrode respectively forming the selected pixel, and applies the voltage of a second potential difference smaller than the first potential difference so as not to cause any energization between the first electrode used as the positive electrode other than the first electrode forming the selected pixel, and the second electrode used as the negative electrode other than the second electrode forming the selected pixel.

Preferably, the electrochromic composition comprises: a hydroquinone derivative and/or a catechol derivative; a ferrocene derivative; and a compound having a carbonyl group.

Preferably, the electrochromic composition comprises an aluminum oxide and/or an aluminum hydroxide to absorb the leuco dye during the energization for the erasion of the display.

Preferably, the electrochromic display device further comprises an absorption layer including an aluminum oxide and/or an aluminum hydroxide to absorb the leuco dye during the energization for the erasion of the display, between the first electrode and the electrochromic composition layer.

According to an aspect of the present invention, in an electrochromic display device of a passive matrix drive, first electrodes and second electrodes are oxidized in at least their surfaces, and an electrochromic composition layer includes a plurality of insulative partition walls arranged between the second electrodes adjoining each other, the insulative partition walls parallely extending into the directions perpendicular to those of the first electrodes, and electrochromic compositions introduced between the insulative partition walls adjoining each other, the electrochromic compositions each containing a supporting electrolyte, a polar solvent, and a leuco dye. The electrochromic display device is adapted to display a selected pixel by applying a voltage of a first potential difference between a first electrode, used as a negative electrode, and a second electrode, used as a positive electrode, both constituting the selected pixel, and by applying a voltage of a second potential difference smaller than the first potential difference so as not to cause any energizations between the first electrodes, used as positive electrodes, other than the first electrode constituting the selected pixel and the second electrodes, used as negative electrodes, other than the second electrode constituting the selected pixel.

That is, because the first electrodes and the second electrodes are oxidized in at least their surfaces, the current-voltage characteristics between the electrodes are nonlinear. Consequently, even when potential differences are generated between the electrodes constituting the pixels (non-selected pixels) around a selected pixel owing to the influences from the selected pixel, the energizations between the electrodes are suppressed. Thus the non-selected pixels are not colored, and only the selected pixel can be colored.

However, when the electrochromic display device is driven at a high speed, then the nonlinearity of the current-voltage characteristics between electrodes is sometimes broken, and also the non-selected pixels are sometimes colored. Accordingly, the aspect is adapted to suppress the sneaking of currents to suppress the coloring caused by leakage currents by applying the voltages between the first electrodes, used as the positive electrodes, other than the first electrode constituting the selected pixel and the second electrodes, used as the negative electrodes, other than the second electrode constituting the selected pixel in the directions reverse to that of the voltage applied between the electrodes constituting the selected pixel. Furthermore, the aspect is adapted to prevent the coloring of the electrochromic compositions on the surfaces of the first electrodes so that the electrochromic compositions may be colored only on the surfaces of the second electrodes, and is adapted to suppress the power consumption of the electrochromic display device, by setting the voltage of the second potential difference to the voltage smaller than that of the first potential difference.

However, when the second electrode constituting the selected pixel is used as the positive electrode and the second electrodes other than the second electrode constituting the selected pixel are used as the negative electrodes, then potential differences are generated between these second electrodes, and currents leak. Accordingly, the leakages of the currents are intercepted by arranging the insulative partition walls between the second electrodes adjoining each other, and thereby the coloring owing to the leakage currents is suppressed.

Consequently, even when the electrochromic display device is driven at a high speed, the electrochromic display device can display a high resolution image, and can realize a high speed and high quality display.

The entire disclosure of Japanese Patent Application No. 2008-290841 filed on Nov. 13, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An electrochromic display device comprising:
a first substrate;
a first electrode provided on an upper surface of the first substrate;
a second substrate formed by a transparent material, the second substrate being provided above the first substrate to be opposed to the first substrate;
a second electrode provided on a lower surface of the second substrate, at least a part of the second electrode being formed with a transparent electrode material; and
an electrochromic composition layer provided in between the first substrate and the second substrate, wherein
the electrochromic display device is driven by a passive matrix drive in which the electrochromic display device performs a display by a first energization between the first electrode and the second electrode, and performs an erasion of the display by a second energization in a direction opposite to a direction of the first energization between the first electrode and the second electrode, wherein
the first electrode comprises a plurality of electrodes which extend parallely, wherein
the second electrode comprises a plurality of transparent display electrodes which extend parallely in a direction perpendicular to an extending direction of the first electrode, wherein
a pixel is defined as a region surrounded by crossing points of the first electrode and the second electrode, wherein
at least a surface of the first electrode and of the second electrode is respectively oxidized, wherein
the electrochromic composition layer comprises (i) a plurality of insulative partition walls which extend parallely in the direction perpendicular to the extending direction of the first electrode and are arranged between respective adjoining transparent display electrodes of the second electrode, and (ii) an electrochromic composition introduced between respective adjoining insulative partition walls, the electrochromic composition including a supporting electrolyte, a polar solvent, and a leuco dye, and wherein
the electrochromic display device displays a selected pixel by applying a voltage of a first potential difference between a first portion of the first electrode used as a negative electrode and a first portion of the second electrode used as a positive electrode, wherein the first portion of first electrode and the first portion of the second electrode define the selected pixel, and applies a voltage of a second potential difference smaller than the first potential difference so as not to cause any energization between a remaining portion of the first electrode used as the positive electrode other than the first portion of the first electrode and a remaining portion of the second electrode used as the negative electrode other than the first portion of the second electrode.

2. The electrochromic display device as claimed in claim 1, wherein the electrochromic composition comprises: a hydroquinone derivative and/or a catechol derivative; a ferrocene derivative; and a compound having a carbonyl group.

3. The electrochromic display device as claimed in claim 1, wherein the electrochromic composition comprises an aluminum oxide and/or an aluminum hydroxide to absorb the leuco dye during the second energization for the erasion of the display.

4. The electrochromic display device as claimed in claim 1, further comprising an absorption layer including an aluminum oxide and/or an aluminum hydroxide to absorb the leuco dye during the second energization for the erasion of the display, between the first electrode and the electrochromic composition layer.

5. The electrochromic display device as claimed in claim 2, wherein the electrochromic composition comprises an aluminum oxide and/or an aluminum hydroxide to absorb the leuco dye during the second energization for the erasion of the display.

6. The electrochromic display device as claimed in claim 2, further comprising an absorption layer including an aluminum oxide and/or an aluminum hydroxide to absorb the leuco dye during the second energization for the erasion of the display, between the first electrode and the electrochromic composition layer.

* * * * *